(12) United States Patent
Cunningham et al.

(10) Patent No.: US 9,731,283 B2
(45) Date of Patent: Aug. 15, 2017

(54) STABILIZATION OF BULK CATALYSTS WITH ORGANO-METALLOXANE FRAMEWORK

(71) Applicant: ExxonMobil Research and Engineering Company, Annandale, NJ (US)

(72) Inventors: Majosefina Cunningham, Whitehall, PA (US); Jason M. Golias, Clinton, NJ (US); Chuansheng Bai, Phillipsburg, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 15/243,007

(22) Filed: Aug. 22, 2016

(65) Prior Publication Data

US 2017/0080410 A1    Mar. 23, 2017

Related U.S. Application Data

(60) Provisional application No. 62/222,327, filed on Sep. 23, 2015.

(51) Int. Cl.

| | | |
|---|---|---|
| *B01J 31/02* | (2006.01) | |
| *B01J 31/34* | (2006.01) | |
| *B01J 31/06* | (2006.01) | |
| *B01J 35/10* | (2006.01) | |
| *C10G 45/08* | (2006.01) | |

(Continued)

(52) U.S. Cl.
CPC ............ *B01J 31/34* (2013.01); *B01J 23/882* (2013.01); *B01J 23/883* (2013.01); *B01J 31/04* (2013.01); *B01J 31/069* (2013.01); *B01J 31/124* (2013.01); *B01J 35/1009* (2013.01); *B01J 35/1014* (2013.01); *B01J 37/084* (2013.01); *C10G 45/08* (2013.01)

(58) Field of Classification Search
None
See application file for complete search history.

(56) References Cited

U.S. PATENT DOCUMENTS

| | | | |
|---|---|---|---|
| 2,700,015 A | 1/1955 | Joyce, Jr. | |
| 2,870,181 A * | 1/1959 | Shacklett | B01J 13/0065 |
| | | | 430/494 |

(Continued)

FOREIGN PATENT DOCUMENTS

WO    2008004551 A2    4/2008

OTHER PUBLICATIONS

PCT/US2016/048003 Search Report and Written Opinion dated Oct. 31, 2016.

*Primary Examiner* — Melvin C Mayes
*Assistant Examiner* — Colette Nguyen
(74) *Attorney, Agent, or Firm* — David M. Weisberg; Jaime L. Sullivan

(57) ABSTRACT

Bulk metallic catalyst precursor compositions are provided that include a Group VIB metal, a Group VIII metal, an organic-compound based component, and an organo-metalloxane polymer or gel. The catalyst precursor compositions can further include a binder. Amorphous sulfided catalysts formed from the catalyst precursor compositions are also provided. The catalyst precursor compositions can have a surface area of about 20 m$^2$/g or less.

20 Claims, 9 Drawing Sheets

(51) Int. Cl.
  *B01J 37/08* (2006.01)
  *B01J 23/882* (2006.01)
  *B01J 23/883* (2006.01)
  *B01J 31/04* (2006.01)
  *B01J 31/12* (2006.01)

(56) References Cited

U.S. PATENT DOCUMENTS

| | | |
|---|---|---|
| 2,912,375 A | 11/1959 | MacLaren |
| 3,297,563 A | 1/1967 | Doumani |
| 4,557,821 A | 12/1985 | Lopez et al. |
| 6,207,130 B1 | 3/2001 | Kareiva et al. |
| 6,231,750 B1* | 5/2001 | Kasztelan ............ B01J 27/047 208/111.01 |
| 7,951,746 B2 | 5/2011 | Bai et al. |
| 9,174,206 B2 | 11/2015 | Beeckman et al. |
| 2003/0029193 A1* | 2/2003 | Feng .................. B01J 31/22 65/17.2 |
| 2008/0132407 A1* | 6/2008 | Bai .................... B01J 23/882 502/173 |
| 2010/0093522 A1* | 4/2010 | Beeckman ............ B01J 23/85 502/185 |

* cited by examiner

STABILIZATION OF BULK CATALYSTS WITH ORGANO-METALLOXANE FRAMEWORK

CROSS-REFERENCE TO RELATED APPLICATIONS

This application claims the benefit of U.S. Provisional Ser. No. 62/222,327, filed on Sep. 23, 2015, the entire contents of which are incorporated herein by reference.

FIELD OF THE INVENTION

This invention relates to a bulk metallic catalyst and a corresponding catalyst precursor comprised of at least one Group VIII metal, at least one Group VIB metal, at least one organic complexing agent, and an organo-metalloxane.

BACKGROUND OF THE INVENTION

Regulations are placing more restrictive quality demands on diesel fuels. For example, the continuing reduction of sulfur specifications in diesel fuels has placed a strain on low pressure hydrotreating units. High pressure units can require increased amounts of hydrogen to perform hydrotreatment, and attempting to retrofit a low pressure unit to handle high pressure hydroprocessing can be expensive. Currently, undercutting and high start-of-run temperatures are used to produce ultra-low-sulfur diesel in low pressure hydrotreating units, but with the corresponding difficulties of undesirable liquid yield losses and/or reduced catalyst cycle length. Higher activity hydrodesulfurization catalysts could allow an increased number of existing low pressure hydrotreatment units to still be used while achieving desired sulfur target levels, thus reducing capital investment and/or avoiding increasing burdens on the hydrogen supply in a refinery.

U.S. Pat. No. 7,951,746 and U.S. Published Patent Application No. 2010/0093522 describe catalysts developed in an attempt to provide increased activity for ultra-low sulfur processing of distillate and/or higher boiling range feeds.

SUMMARY OF THE INVENTION

In one aspect, a bulk metallic catalyst precursor composition is provided, comprising: a Group VIII metal; a Group VIB metal, a combined amount of Group VIII metal and Group VIB metal being about 1 wt % to about 80 wt % on a metal oxide basis; about 10 wt % to about 60 wt % of an organic compound-based component, the organic compound-based component is based on at least one organic complexing agent; and about 1 wt % to about 50 wt % of an (optionally water soluble) organo-metalloxane polymer, organo-metalloxane gel, or combination thereof, the catalyst precursor composition having a surface area of 20 $m^2/g$ or less based on BET.

In another aspect, an amorphous sulfided bulk metallic catalyst is provided, comprising: a Group VIII metal; a Group VIB metal; at least about 10 wt % carbon; and about 1 wt % to about 50 wt % of an (optionally water soluble) organo-metalloxane polymer, organo-metalloxane gel, or combination thereof, the catalyst being formed by sulfiding a catalyst precursor composition having a surface area of 20 $m^2/g$ or less based on BET, the catalyst optionally comprising a combined amount of Group VIII metal and Group VIB metal of about 1 wt % to about 80 wt %, on a metal oxide basis.

DETAILED DESCRIPTION OF THE EMBODIMENTS

Overview

Figure 1:
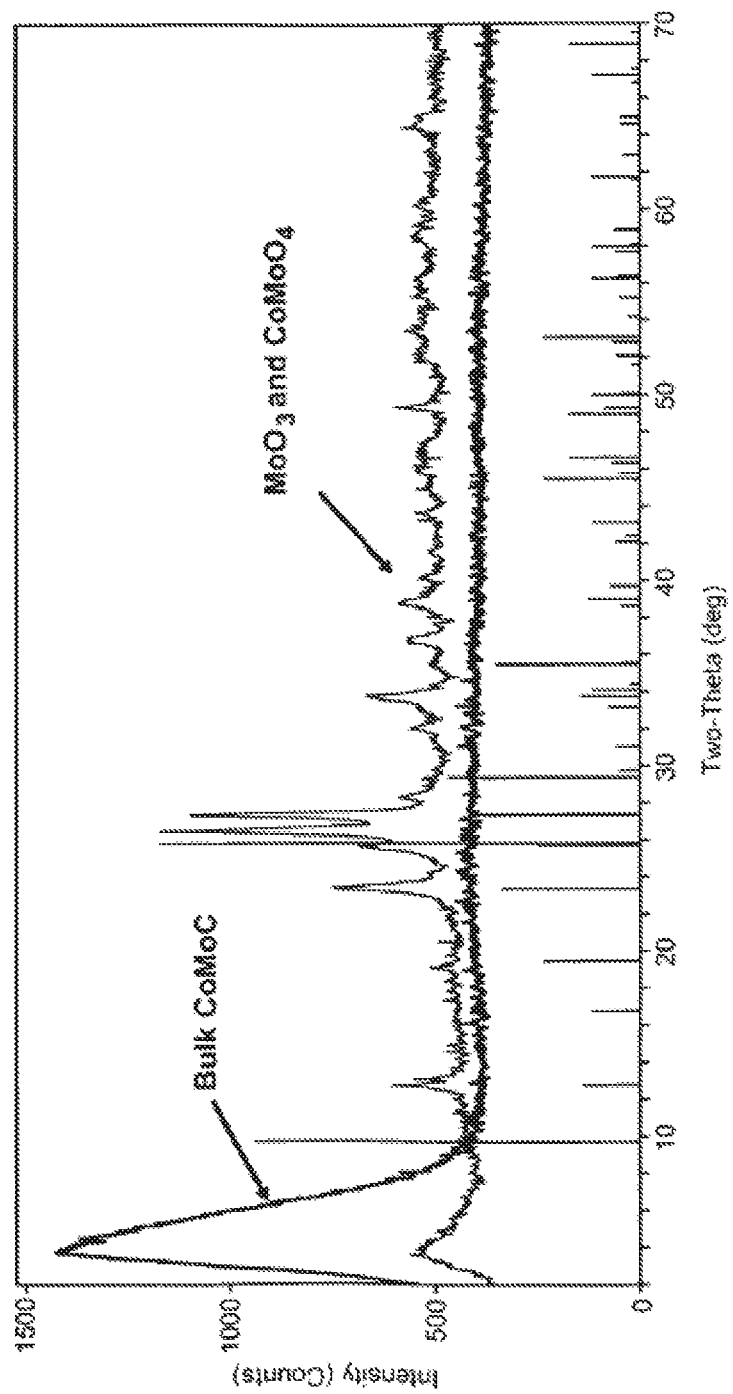
FIG. 1 provides X-ray Diffraction (XRD) patterns for a bulk CoMo catalyst precursor according to an embodiment of the invention and a comparative CoMo catalyst.

The catalysts described herein can be bulk catalysts formed by heating a catalyst precursor comprised of about 1 wt % to about 80 wt %, or about 10 wt % to about 80 wt %, of a Group VIII metal and a Group VIB metal, based on the total weight of the bulk catalyst particles. The weight of metal is measured as metal oxide. The catalyst precursor can further include a) an organic compound-based material and b) a organo-metalloxane polymer or gel, such as a water soluble organo-siloxane polymer. In an aspect, the Group VIB metal can be Mo or W, the Group VIII metal can be a non-noble metal such as Co or Ni, or any combination thereof of one or more Group VIB and Group VIII meals. For example, the Group VIB metal can be Mo and the Group VIII metal can be Co. Optionally, the catalyst can be sulfided using a gas-phase sulfidation procedure at a temperature of about 350° C. or less.

In addition to the metals, the catalyst precursor can include an organic complexing agent component and an organo-metalloxane polymer and/or gel component. Examples of the organic complexing agent are described in detail below. During catalyst precursor formation, the organic complexing agent can allow an amorphous catalyst structure (or at least amorphous within the detection limit of X-ray diffraction) to form. Without being bound by any particular theory, it is believed that the organo-metalloxane polymer and/or gel in the catalyst precursor can become at least partially associated with the amorphous structure provided by the organic complexing agent. This can allow the organo-metalloxane polymer and/or gel to provide additional stability for the amorphous structure, so that if any degradation of the organic compound occurs, the organo-metalloxane polymer and/or gel can allow the catalyst to substantially retain its structural integrity.

An example of an organo-metalloxane polymer is an organo-siloxane polymer. Organo-siloxane polymers correspond to polymers with a backbone of alternating silicon and oxygen atoms (sometimes referred to as a silica backbone) that also have at least one type of organic functional group attached to at least a portion of the silicon atoms in the backbone. Examples of organo-siloxane polymers include polydimethylsiloxane, and polyphenylsiloxane. More generally, organo-siloxane polymers can include polyalkylsiloxanes, polydialkylsiloxanes, polyarylsiloxanes, polydiarylsiloxanes, polyalkylarylsiloxanes, and co-polymers formed from the various types of organo-siloxane monomers. Optionally, a portion of the monomers in an organo-siloxane polymer can correspond to siloxane monomers, silane monomers (i.e., monomers where an Si—Si bond continues the backbone of the polymer), and/or organosilane monomers. Due to the nature of the organo-siloxane polymer structure, many types of organo-siloxane polymers are water insoluble, which is defined herein as having a solubility in water of less than 1 gram per liter. However, some organo-siloxane polymers have additional functional groups as part of the organic portion that can result in water soluble polymers. For example, some Dynasylan® Hydrosil polymers available from Evonik have organic groups containing an amine functionality, so that the polymers are soluble in water.

Other examples of organo-metalloxanes can include, but are not limited to, organo-alumoxanes, organo-titanoxanes, organo-zirconoxanes, and organo-metalloxanes based on La, Y, or a rare earth metal. It is noted that an organo-metalloxane can potentially include more than one type of metal with a metal-oxygen linkage. For example, organo-siloxanes and organo-alumoxanes can potentially include other metals with metal-oxygen linkages, such as rare earth metals or tin.

Based on X-ray diffraction, it appears that the Group VIII metals and the Group VIB metals in the catalyst precursor after heating do not have the long range ordering typically found in materials that are primarily a crystalline oxide. Instead, in some aspects it appears that the metals are complexed by the organic complexing agent in the catalyst precursor. The metals are complexed by the organic complexing agent when the metals and complexing agent are mixed together. The nature of the complex may change after one or more heating steps, as the organic complexing agent may undergo one or more conversions or reactions to form an organic compound-based component. In an alternative embodiment, the catalyst precursor can have some crystalline or nanocrystalline characteristics (based on XRD) in addition to having characteristics of metals that are complexed by the organic complexing agent.

Figure 4:
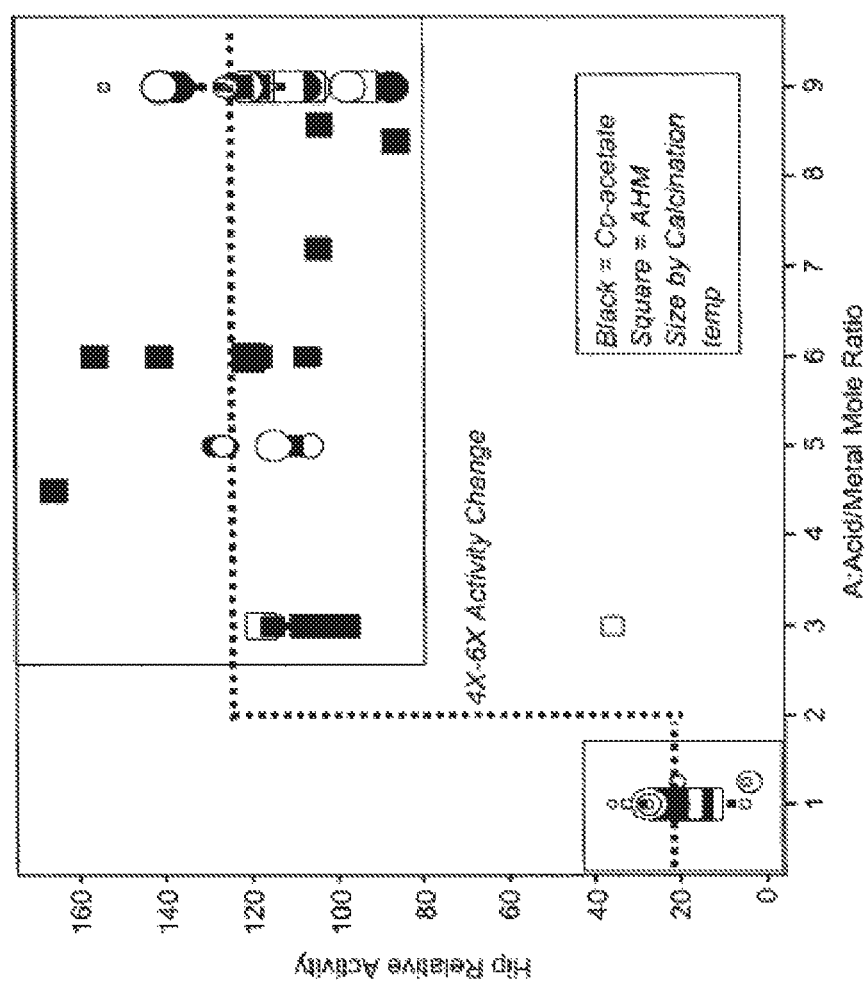
FIG. 4 depicts catalyst activity as a function of the amount of organic complexing agent used to form a catalyst precursor.

The X-ray Diffraction data provided in FIG. 4 of this application was generated under the following conditions. X-ray powder diffraction analyses of the samples were obtained using a PANalytical™ X-pert PRO MPD, manufactured by PANalytical, Inc., and equipped with a X-Cellerator™ detector. The 2 theta scan used a Cu target at 45 kV and 40 mA. The diffraction patterns were taken in the range of 20° to 70° and 20° to 70° 2θ. The step size was 0.2 degrees and the time/step was 480 seconds. The remaining X-ray Diffraction data and patterns provided in this application were generated under the following conditions. X-ray powder diffraction analyses of the samples were obtained using a Bruker D4 Endeavor™, manufactured by Bruker AXS and equipped with a Vantec-1™ high-speed detector. The 2θ scan used a Cu target at 35 kV and 45 mA. The diffraction patterns were taken in the range of 2° to 70° 2θ. The step size was 0.01794 degrees and the time/step was 0.1 second.

In this application, an "amorphous" catalyst or catalyst precursor refers to a catalyst or catalyst precursor that lacks the long range order or periodicity to have peaks in X-ray diffraction spectra that can be sufficiently distinguished from the background noise in the spectra, such as by determining a ratio of peak intensity versus background noise. This definition for amorphous includes the possible presence of nanocrystalline portions of catalyst or catalyst precursor, since such nanocrystallinity cannot be resolved by XRD. Nanocrystalline catalyst or catalyst precursor refers to catalyst or catalyst precursor that has some crystallinity but with a grain size of less than 100 nm. This determination is made using X-ray diffraction spectra generated according to the conditions described above. Broadening of X-ray spectra occurs increasingly as particle sizes shrink, such as when grain sizes are <100 nm, resulting in an XRD pattern with broadened or apparently non-existent peaks. Without being bound by any particular theory, it is believed that the high activity of the catalyst systems according to various embodiments of the invention results from an amorphous and/or nanocrystalline component.

In an aspect, the bulk catalyst particles according to the invention, formed by sulfidation of catalyst precursor particles, can have a characteristic X-ray diffraction pattern of an amorphous material. Generally, it is believed that the long range ordering typically found in crystalline phases of Group VIII and Group VIB metal oxides and/or sulfides are not present in bulk catalysts formed according to the invention. In particular, XRD spectra of catalysts and catalyst precursors according to the invention either do not show crystalline phases of CoMo oxides, or alternatively only weakly show the crystalline CoMo oxide character. Without being bound by any particular theory, it is believed that the organic complexing agent and/or the resulting organic compound-based component interrupts or inhibits crystallization of oxides of the Group VIB and Group VIII metals. Instead of forming crystalline oxides with long range ordering, it is believed that at least a portion of the bulk catalyst particles have a structure that continues to involve some sort of complex with an organic compound-based component. This structure may be amorphous and/or crystalline on a length scale that is not readily resolved by XRD. The nature of the complexation may differ from the complexation present in the catalyst precursor. Additionally, at least a portion of the metals present in the catalyst can be in the form of metal sulfides, as opposed to complexed metals or amorphous/small crystal metal oxides.

Organo-Metalloxane Polymer

In various aspects, an organo-metalloxane polymer, organo-metalloxane gel, or combination thereof (sometimes referred to herein as an organo-metalloxane compound) can be incorporated into a catalyst precursor in order to improve the stability of the resulting catalyst formed from the catalyst precursor. The organo-metalloxane compound can be incorporated into the catalyst precursor in any convenient manner. In some aspect, the organo-metalloxane compound can be incorporated by impregnation. After formation of a catalyst precursor, but prior to heating to modify the nature of the organic complexing agent, the catalyst precursor can be impregnated with the organo-metalloxane compound. The impregnation can occur, for example, by dissolving the organo-metalloxane compound in a suitable solvent and then exposing the catalyst precursor to the solution containing the organo-metalloxane compound. The catalyst precursor can be exposed to the solution for an effective amount of time, such as about 1 minute to about 10 hours, to impregnate the catalyst precursor. For water soluble polymers or gels, the organo-metalloxane polymer/gel can be an aqueous solution. For polymers or gels that are not soluble in water, the polymer or gel can be dissolved in an organic solvent such as decane, cyclohexane, or another convenient solvent. Alternatively, polymers or gels that are not soluble in water can be dissolved in a solution containing water and a co-solvent or compatibility solvent. For example, alcohols containing at least 6 carbons, or at least 8 carbons, and optionally containing at least 3 carbons per oxygen, or at least 4 carbons per oxygen, or at least 5 carbons per oxygen, can serve as a co-solvent to allow a water insoluble polymer to be dissolved in a solution having a single phase where at least 25 wt % of the solvent is water, or at least 50 wt %, or at least 70 wt %.

Rather than impregnating a catalyst precursor after the catalyst precursor is formed, another option can be to include the organo-metalloxane compound in the synthesis mixture used to form the catalyst precursor. In this type of aspect, a solution of the organo-metalloxane compound can be added in a desired amount to the synthesis mixture. The synthesis mixture for forming a catalyst precursor as described herein can often correspond to an aqueous mixture, so an aqueous solution or a solution with co-solvents of water and a co-solvent (such as a long chain alcohol) can be used to introduce the organo-metalloxane compound into the synthesis mixture.

The amount of organo-metalloxane compound introduced into the catalyst precursor can correspond to about 0.5 wt % to about 50 wt % of the weight of the catalyst precursor. In various aspects, the amount of organo-metalloxane compound can be about 0.5 wt % to about 5.0 wt %, or about 0.5 wt % to about 10 wt %, or about 0.5 wt % to about 15 wt %, or about 0.5 wt % to about 20 wt %, or about 0.5 wt % to about 30 wt %, or about 0.5 wt % to about 50 wt %, or about 1.0 wt % to about 5.0 wt %, or about 1.0 wt % to about 10 wt %, or about 1.0 wt % to about 15 wt %, or about 1.0 wt % to about 20 wt %, or about 1.0 wt % to about 30 wt %, or about 1.0 wt % to about 50 wt %, or about 2.0 wt % to about 5.0 wt %, or about 2.0 wt % to about 10 wt %, or about 2.0 wt % to about 15 wt %, or about 2.0 wt % to about 20 wt %, or about 2.0 wt % to about 30 wt %, or about 2.0 wt % to about 50 wt %, or about 5.0 wt % to about 10 wt %, or about 5.0 wt % to about 15 wt %, or about 5.0 wt % to about 20 wt %, or about 5.0 wt % to about 30 wt %, or about 5.0 wt % to about 50 wt %, or about 10.0 wt % to about 15 wt %, or about 10.0 wt % to about 20 wt %, or about 10.0 wt % to about 30 wt %, or about 10.0 wt % to about 50 wt %.

Various organo-siloxane polymers are commercially available. Examples of water soluble organo-siloxane polymers can include organo-siloxane polymers that include amine funcational groups. Organo-alumoxanes are also commercially available. Additionally, organo-alumoxanes can be synthesized, such as according to the methods described U.S. Pat. No. 6,207,130, which is incorporated herein by reference for the limited purpose of incorporating a method for synthesis of organo-alumoxanes. Organo-titanoxanes are also known. An example of synthesis of an organo-titanoxane is provided in U.S. Pat. No. 2,870,181. It is also believed that suitable organo-metalloxane polymers and/or gels can be formed, for example, from aqueous zirconium complexes. It is also believed that suitable organo-metalloxane polymers and/or gels can be formed, for example, from rare earth metal triflates.

Catalyst Precursor

In contrast to many conventional hydroprocessing catalysts, which typically are comprised of a carrier impregnated with at least one Group VIII metal and at least one Group VIB metal, the catalysts of the present invention are bulk catalysts. The bulk catalyst precursor compositions of the invention, obtained by a) mixing of metal reagents with an organic complexing agent, b) either mixing or impregnation with an organo-siloxane polymer, and then c) heating and/or mixing, have a relatively low surface area (measured by Brunauer-Ernett-Teller method, or BET) of about 16 $m^2/g$ or less. In another embodiment, the bulk catalyst precursor compositions have a surface area (measured by BET) of less than about 50.0 $m^2/g$, or less than about 40.0 $m^2/g$, or less than about 30.0 $m^2/g$, or less than about 20.0 $m^2/g$, or less than about 10.0 $m^2/g$, or less than about 9.0 $m^2/g$, or less than about 7.5 $m^2/g$, or less than about 5.0 $m^2/g$, or less than about 4.0 $m^2/g$, or less than about 3.0 $m^2/g$, or less than about 2.5 $m^2/g$. In still another embodiment, the bulk catalyst precursor compositions have a surface area of at least about 0.05 $m^2/g$, or at least about 0.1 $m^2/g$, or at least about 0.25 $m^2/g$. Each of the above upper limits for the bulk catalyst precursor surface area is explicitly contemplated in conjunction with each of the above lower limits.

In various aspects, a binder material can also be incorporated into the bulk catalyst precursor composition. For example, after forming catalyst precursor particles that initially include metals, an organic complexing agent, and a silica polymer, suitable binders may be mixed with the precursor composition and extruded to form particles. For aspects including a binder, the surface area of the particles may be higher, such as about 30 $m^2/g$ or less, or about 25 $m^2/g$ or less, or about 20 $m^2/g$ or less, or the surface area can be similar to the precursor without binder, as described above.

The molar ratio of Group VIII metal to Group VIB metal ranges generally from about 1 to 10 to about 10 to 1. Expressed as a fractional value, the molar ratio is generally from about 0.1 to about 10. For example, the ratio of Group VIII metal to Group VIB metal can be less than about 10, or less than about 5, or less than about 3, or less than about 2, and/or greater than about 0.1, or greater than about 0.33, or greater than about 0.5.

In various aspects, the catalyst compositions (and/or corresponding catalyst precursors) can also contain any additional component that is conventionally present in hydroprocessing catalysts. For example, the catalyst composition and/or catalyst precursor can also contain an acidic component, e.g. phosphorus or boron compounds, additional transition metals, rare earth metals, main group metals such as Si or Al, or mixtures thereof. Suitable additional transition metals are, e.g. rhenium, ruthenium, rhodium, iridium, chromium, vanadium, iron, platinum, palladium, cobalt, nickel molybdenum, zinc, niobium, or tungsten. All these metals are generally present in the sulfided form if the catalyst composition has been sulfided. Prior to sulfidation, at least a portion of one or more metals can be complexed by the organic compound-based material in the catalyst precursor. After sulfidation, it is believed that at least a portion of the sulfided metals are still somehow directly or indirectly bound to the organic compound-based material (e.g., carbon) in the catalyst.

Bulk metallic catalysts as described herein can be prepared by the controlled heating of Group VIII and Group VIB precursor compounds that are complexed with an organic complexing agent, such as an organic acid, and further supported by a silica polymer that is associated with the structure formed by the organic complexing agent. The organic complexing agent can be a metal binding group or chelating agent, can be a bidentate ligand, or a combination thereof. Preferably, the organic complexing agent is suitable for forming metal-ligand complexes in solution.

In an aspect where the catalyst precursor is formed from a solution containing the Group VIII metal, Group VIB metal, organic complexing agent, and optionally an organo-metalloxane compound, the Group VIII compound and/or the Group VIB compound can be water soluble salts in the appropriate predetermined concentration to yield the desired molar ratios as mentioned above. Examples of Group VIII metals are non-noble metals, such as Co and Ni, with Co being preferred in some aspects. Preferably, the Group VIII metals are non-noble metals. Examples of Group VIB metals are Mo and W, with Mo being preferred in some aspects. Non-limiting examples of suitable Co precursor compounds include carbonates, nitrates, sulfates, acetates, chlorides, hydroxides, propionates, glycinates, hydroxycarbonates, acetyl acetates, acetyl acetonates, metallic Co(0), Co oxides, Co hydrated oxides, Co carboxylates (in particular Co glyoxylate), Co citrate, Co gluconate, Co tartrate, Co glycine, Co lactate, Co naphthenate, Co oxalate, Co formate, and mixtures thereof, including ammonium or amine forms of the above. Preferred molybdenum and tungsten precursor compounds include alkali metal or ammonium molybdate (also peroxo-, di-, tri-, tetra-, hepta-, octa-, or tetradecamolybdate), molybdic acid, phosphomolybdic acid, phosphotungstic acid, Mo—P heteropolyanion compounds, W—Si heteropolyanion compounds, Co—Mo—W heteropolyanion compounds, alkali metal or ammonium tungstates (also meta-, para-, hexa-, or polytungstate), acetyl acetonates, and mixtures thereof. In still other embodiments, any suitable Group VIII or Group VIB metal reagent can be used to prepare Group VIII or Group VIB metal solutions.

An organic acid is an example of an organic complexing agent. Non-limiting examples of organic complexing agents suitable for use herein include pyruvic acid, levulinic acid, 2-ketogulonic acid, keto-gluconic acid, thioglycolic acid, 4-acetylbutyric acid, 1,3-acetonedicarboxylic acid, 3-oxo propanoic acid, 4-oxo butanoic acid, 2,3-diformyl succinic acid, 5-oxo pentanoic acid, 4-oxo pentanoic acid, ethyl glyoxylate, glycolic acid, glyoxylic acid, glucose, glycine, oxamic acid, glyoxylic acid 2-oxime, ethylenediaminetetraacetic acid, nitrilotriacetic acid, N-methylaminodiacetic acid, iminodiacetic acid, diglycolic acid, malic acid, gluconic acid, acetylacetone, citric acid, and combinations thereof. Preferred organic acids are glyoxylic acid, oxalacetic acid, 2-ketogulonic acid, alpha-ketoglutaric acid, 2-ketobutyric acid, pyruvic acid, keto-gluconic acid, thioglycolic acid, glycolic acid, and combinations thereof. In some aspects, the organic complexing agent can be glyoxylic acid, gluconic acid, oxalacetic acid, or a combination thereof.

In another aspect, the organic complexing agent can be an organic acid that contains a —COOH functional group and at least one additional functional group selected from carboxylic acid: —COOH, hydroximate acid: —NOH—C=O, hydroxo: —OH, keto —C=O, amine: —NH$_2$, amide: —C(=O)—NH$_2$, imine: —C=NOH, epoxy: =COC=, or thiol: —SH. In some aspects, the organic complexing agent can be a bidentate ligand.

The process for preparing the catalysts of the present invention comprises multiple steps. The first step is a mixing step wherein at least one Group VIII metal reagent, at least one Group VIB metal reagent, and at least one organic complexing agent are combined together. Optionally, the organo-metalloxane compound can also be incorporated into the catalyst precursor at this step. In an embodiment, one or more of the metal reagents and organic complexing agent can be provided in the form of solutions, such as aqueous solutions. In another embodiment, one or more of the metal reagents and organic complexing agent can be provided in the form of slurries. In still another embodiment, one or more of the metal reagents and organic complexing agent can be provided in the form of a solid material. Those of skill in the art will recognize that still other forms of providing the organic complexing agent and metal reagent are possible, and that any suitable form (solution, slurry, solid, etc.) can be used for each individual reagent and/or organic complexing agent in a given synthesis.

The metal reagents and organic complexing agent (and optionally the organo-metalloxane compound) are mixed together to form a precursor mixture. In an embodiment where one or more of the metal reagents or organic complexing agent are provided as a solution or slurry, mixing can involve adding the metal reagents and organic complexing agent to a single vessel. If one or more of the metal reagents and organic complexing agent are provided as solids, mixing can include heating the organic complexing agent to a sufficient temperature to melt the complexing agent. This will allow the organic complexing agent to solvate any solid metal reagents.

The temperature during mixing can be from ambient temperature to the boiling point of the solvent. The preparation can be performed in any suitable way. For example, in embodiments involving solutions and/or slurries, separate solutions (or slurries) can be prepared from each of the catalytic components. That is, a Group VIII metal compound in a suitable solvent and a Group VIB metal in a suitable solvent can be formed. Non-limiting examples of suitable solvents include water and the $C_1$ to $C_3$ alcohols. Other suitable solvents can include polar solvents such as alcohols, ethers, and amines. Water is a preferred solvent. It is also preferred that the Group VIII metal compound and the Group VIB compound be water soluble and that a solution of each be formed, or a single solution containing both metals be formed. The organic complexing agent can be prepared in a suitable solvent, preferably water. The three solvent components can be mixed in any sequence. That is, all three can be blended together at the same time, or they can be sequentially mixed in any order. In an embodiment, it is preferred to first mix the two metal components in an aqueous media, than add the organic complexing agent. Optionally, the organo-metalloxane compound can also be added as a solution, such as an aqueous solution or a solution based on water and a co-solvent. In such an optional aspect, the four solvent components can be mixed in any sequence.

The process conditions during the mixing step are generally not critical. It is, e.g., possible to add all components at ambient temperature at their natural pH (if a suspension or solution is utilized). It is generally preferred to keep the temperature below the boiling point of water, i.e., 100° C. to ensure easy handling of the components during the mixing step. However, if desired, temperatures above the boiling point of water or different pH values can be used. In an embodiment where the organic complexing agent is an acid or base having a conjugate base/acid, the pH of the mixture can be adjusted to drive the acid/base equilibrium toward a desired form. For example, if the organic complexing agent is an acid, the pH of the solution can be raised to drive the equilibrium toward formation of more of the conjugate base. If the reaction during the mixing step is carried out at increased temperatures, the suspensions and solutions that are added during the mixing step are preferably preheated to an increased temperature which can be substantially equal to the reaction temperature.

The amount of metal precursors and organic complexing agent (and optionally organo-metalloxane compound) in the mixing step can be selected to achieve preferred ratios of metal to organic compound-based material in the catalyst precursor after heating. For example, the ratio of organic acid to total metal in the mixed solution (or other mixture of metal reagents and organic complexing agent) can reach a minimum level that results in a highly active catalyst.

In an aspect, the amount of organic complexing agent used in the mixed solution can be enough to provide at least about 10 wt % of organic compound-based material in the catalyst precursor formed after heating, or at least about 20 wt %, or at least about 25 wt %, or at least about 30 wt %. In another aspect, the amount of organic complexing agent used in the mixed solution can provide less than about 60 wt % of organic compound-based material in the catalyst precursor formed after heating, or less than about 40 wt %, or less than about 35 wt %, or less than about 30 wt %. For example, the amount of organic complexing agent used in the mixed solution can be enough to provide between about 20 wt % and about 35 wt % of organic compound-based material in the resulting catalyst precursor.

A desired amount of organic compound-based material in the catalyst precursor can be achieved based on the amount of organic complexing agent to metal ratio in the mixed solution and based on the thermal activation conditions used to form the catalyst precursor. The term "organic compound-based material" refers to the carbon containing compound present in either the catalyst precursor after heating, or in the catalyst after sulfidation. The organic compound-based material is derived from the organic complexing agent, but may be modified due to heating of the catalyst precursor and/or sulfidation of the precursor to form the catalyst. Note that the eventual form of the organic compound-based material may include carbon not traditionally considered as "organic", such as graphitic or amorphous carbon. The term organic compound-based material used here specifies only that the carbon was derived originally from the organic complexing agent and/or another organic carbon source used in forming the catalyst precursor.

In this discussion, the weight percentage of organic compound-based material in the catalyst precursor was determined by performing a Temperature Programmed Oxidation on the catalyst precursor under the following conditions. Temperature Programmed Oxidation using TGA/MS was performed on dried and heated samples. The TGA/MS data was collected on a Mettler TGA 851 thermal balance which was interfaced with a quadrupole mass spectrometer equipped with a secondary electron multiplier. Between 20 and 25 mg of sample was heated at 4° C./min from ambient temperature to 700° C. in flowing 14.3% $O_2$ in He (77 cc/min) at one atmosphere total pressure. In the TGA/MS experiments, the effluent gas was carried over to the MS instrument via a capillary line and specific m/e fragments such as 18 ($H_2O$), 44 ($CO_2$), 64 ($SO_2$) were analyzed as markers for the decomposition products and qualitative correlation with gravimetric/heat effects.

The weight percentage of material lost during a TPO procedure represents the weight percentage of organic compound-based material. The remaining material in the catalyst precursor is considered to be metal in the form of some type of oxide. For clarity, the weight percent of metal present in the catalyst precursor is expressed as metal oxide in the typical oxide stoichiometry. For example, weights for cobalt and molybdenum are calculated as CoO and $MoO_3$, respectively.

A similar calculation can be performed to determine the weight percentage of organic compound-based component in the catalyst formed after sulfidation. Once again, the weight percent of organic compound-based component is determined by TPO, according to the method described above. The remaining weight in the catalyst corresponds to metal in some form, such as oxide, oxysulfide, or sulfide.

The amount of organic complexing agent used in the mixed solution can also be enough to form metal-organic complexes in the solution under reaction conditions. In an embodiment where the complexing agent is an organic acid, the ratio of carboxylic acid groups of the organic acids to metals can be at least about 0.33, or at least about 0.5, or at least about 1 (meaning that about the same number of carboxylic acid groups and metal atoms are present), or at least about 2, or at least about 3. In another embodiment, the ratio of carboxylic acid groups to metals can be 12 or less, or 10 or less, or 8 or less.

Additionally or alternately, the molar ratio used in the mixing solution of organic complexing agent to metals can be about 6.0 to 1 or less, or about 5.5 to 1 or less, or about 5.0 to 1 or less, or about 4.8 to 1 or less, or about 4.6 to 1 or less and/or about 0.5 to 1 or more, or about 1 to 1 or more, or is about 1.5 to 1 or more, or about 2 to 1 or more, or about 2.5 to 1 or more, or about 3.0 to 1 or more, or about 3.5 to 1 or more.

Additionally or alternately, the molar ratio of the Group VIII metal to the Group VIB metal is at least about 0.1, or at least about 0.2, or at least about 0.33, or at least about 0.5 and/or the molar ratio of the Group VIII metal to the Group VIB metal is about 0.9 or less, or about 0.6 or less.

The second step in the process for preparing a bulk catalyst from a catalyst precursor as described above is a heating step. In various aspects, the heating step can be used to remove water from the mixture and/or to form an organic compound-based component in the catalyst precursor. The organic compound-based component is the product of heating the organic complexing agent used in the mixing solution. The organic complexing agent may be substantially similar to the organic compound-based component, or the organic compound-based component may represent some type of decomposition product of the organic complexing agent. Alternatively, without being bound by any particular theory, heating of the organic complexing agent may result in cross linking of the complexing agent to form an organic compound-based component.

In some aspects, the heating and/or drying can be performed in multiple phases according to a heating profile. For example, the first phase of the heating profile can be a partial drying phase, such as a drying phase performed at a temperature from about 40° C. to about 60° C. in a vacuum drying oven for an effective amount of time. An effective amount of time corresponds to a time sufficient to remove water to the point of gel formation. Typically it is believed a gel will form when from about 80% to about 90% of the water is removed. In embodiments where the mixture of the metal reagents and the organic complexing agent is in the form of a solution or slurry, it can be preferred to agitate the mixture of metal reagents, organic complexing agent, and optional organo-metalloxane compound(s) at about ambient temperature for an effective period of time to ensure substantial uniformity and dissolution of all components prior to heating. Alternatively, in embodiments where the organic complexing agent is provided as a solid, an initial heating phase can correspond to heating used to melt the organic complexing agent. The temperature of the mixture can be maintained for an effective amount of time to allow the melted organic complexing agent to solvate and/or mix with the metal reagents.

In an embodiment, the next heating or drying phase in the heating profile is to raise the temperature to about 110° C. to about 130° C., preferably from about 110° C. to about 120°

C., to drive off additional water to the point that high temperature heating can be done without causing boiling over and splashing of solution. At this point the gel will be transformed into a solidified material. The effective amount of time to form the dried material, that is from gel formation to solidified material, can be from seconds to hours, preferably from about 1 minute to several days, more preferably from about 1 minute to 24 hours, and still more preferably from about 5 minutes to about 10 hours. The gel, upon solidification and cooling to room temperature can also take the form of a black rubbery solid material. The gel or solidified material can be brought to ambient temperature and saved for future heating at higher temperatures. In the alternative, the gel or solidified material can be used as a catalyst precursor at this stage.

Optionally, the solid material can be ground to a powder before or after thermal activation. The grinding can take place prior to any heating steps at temperatures of about 275° C. or greater, or the grinding can take place after heating to about 275° C. or greater. Any suitable grinding technique can be used to grind the solid material. In aspects where the organo-metalloxane compound is not introduced as part of the mixing solution, it can be convenient to impregnate the powder with the organo-metalloxane polymer and/or gel.

The catalyst precursor can be subjected to a further heating stage to partially decompose materials within the catalyst precursor. This additional heating stage can be carried out at a temperature from about 100° C. to about 500° C., preferably from about 250° C. to about 450° C., more preferably from about 300° C. to about 400° C., and still more preferably from about 300° C. to about 340° C., for an effective amount of time. This effective amount of time can range from about 0.5 to about 24 hours, such as from about 1 to about 5 hours. In another embodiment, heating can be accomplished by ramping the temperature in a furnace from room temperature to about 325° C. in one hour. In an embodiment, the heating (including possible decomposition) can be carried out in the presence of a flowing oxygen-containing gas such as air, a flowing inert gas such as nitrogen, or a combination of oxygen-containing and inert gases. In another embodiment, the heating can be carried out in the atmosphere present in the furnace at the beginning of the heating process. This can be referred to as a static condition, where no additional gas supply is provided to the furnace during heating. The atmosphere in the furnace during the static condition can be an oxygen-containing gas or an inert gas. It is preferred to carry out the heating in the presence of an inert gas atmosphere, such as nitrogen. Without being bound by any particular theory, the material resulting from this additional heating may represent a partial decomposition product of the organic complexing agent, resulting in the metals being complexed by an organic compound-based material or component.

Without being bound by any particular theory, it is believed that the organic complexing agent and/or the resulting organic-compound based component plays a role in the unexpected high activity of the final catalysts. It is believed that the organic complexing agent and/or the resulting organic compound-based component either assists in stabilization of the metal particles and/or directly interacts with metal active sites and prevents the metal from agglomerating. In other words, the organic complexing agent and/or organic compound-based component enhances the dispersion of the active sites. When a catalyst precursor is formed with an amount of organic compound-based component that is less than the desired range, the activity of the resulting catalyst is lower.

Additionally or alternately, without being bound by any particular theory, it is believed that the organo-metalloxane polymer and/or gel can become associated with the organic material (such as the organic compound-based component) resulting from the additional heating of the catalyst precursor. This association can occur prior to heating (such as by association of the polymer with the organic complexing agent), during heating, or after heating. It is believed that the association of the organo-metalloxane polymer and/or gel with the material resulting from the additional heating can allow a secondary silica structure to form in the catalyst. This secondary silica structure can reduce or minimize the amount of loss in structural integrity that could occur when a portion of the organic complexing agent and/or the resulting decomposition product from heating is removed from the catalyst or catalyst precursor structure. For example, many of the types of hydrocarbon feeds that can be hydrotreated using the catalyst can also represent feeds that can act as solvents for the organic complexing agent and/or the organic compound-based component. During a hydrotreatment processing run, a portion of the organic material in a catalyst can be solvated and removed from the catalyst structure. Without the presence of the secondary silica structure, the removal of organic material can lead to a corresponding removal of catalytic Group VIII and/or Group VIB metals from the catalyst as well. The presence of the secondary silica structure in the catalyst can reduce or minimize such loss of catalytic metals when solvation or other removal of organic material from the catalyst occurs.

The association between the organic material in a bulk catalyst or bulk catalyst precursor and the organo-metalloxane polymer and/or gel can potentially be enhanced for water soluble polymers or gels. For example, water soluble organo-metalloxane polymers and/or gels can tend to have organic portions that include polar functional groups, such as amine groups. These polar functional groups can contribute to the solubility of the polymer. Without being bound by any particular theory, it is believed that such functional groups can also contribute to and/or enhance the association of the organo-metalloxane polymer and/or gel with the organic material in a bulk catalyst. This enhanced association can allow the secondary silica structure formed by the organo-metalloxane polymer and/or gel to have an improved ability to retain metals in the catalyst during hydroprocessing.

As previously mentioned, the heating step can be performed in a variety of ways. The heating step can start with one or more initial heating stages at a lower temperature followed by heating at a temperature of about 275° C. or greater. In other embodiments, the heating profile can include only temperatures of about 130° C. or lower, or the heating profile can include immediately ramping the temperature to about 275° C. or greater, or about 325° C. or greater. In some aspects, the preparation conditions can be controlled and designed so that the mixed solution does not go through violent evaporation, spill or interruption during the entire heating profile. Such embodiments typically involve an initial heating at a temperature below 100° C. In other aspects, the heating profile can include conditions that lead to rapid evaporation while the catalyst precursor still contains a substantial amount of water. This can lead to boiling or splashing of the mixture used to form the catalyst precursor. While boiling or splashing of the mixture for forming the catalyst precursor is inconvenient, it is believed that a suitable catalyst precursor can still be formed under these conditions.

A bulk powder catalyst precursor composition according to the invention, obtained after grinding and heating, can be directly formed into shapes suitable for a desired catalytic end use. Alternately, the bulk powder can be mixed with a conventional binder material then formed into the desired shapes. If a binder is used, it may be either introduced before or after decomposition (heating) of the mixture used to form the catalyst precursor. Examples of potential binders include Actigel™ clay, available from Active Minerals International of Hunt Valley, Md.; Nyacol™ 2034 DI, available from Nyacol Nano Technologies, Inc. of Ashland, Mass.; Dupont™ Tyzor® LA, which is a lactic acid chelated titanium binder; a polyethylene glycol polymer, such as one having suitable molecular weight and other properties to allow for mixing of bulk catalyst precursor powder with the polyethylene glycol and then extruding the bound catalyst; or a Si-resin, such as Q-2230™ available from Dow Corning. In still another embodiment, a binder precursor, such as silicic acid, Si acetate, or Al acetate, may be added to the mixture used for synthesizing the catalyst precursor.

The third step in the preparation of the catalysts of the invention is a sulfidation step. Sulfidation is generally carried out by contacting the catalyst precursor composition with a sulfur containing compound, such as elemental sulfur, hydrogen sulfide or polysulfides. Sulfidation can also be carried out in the liquid phase utilizing a combination of a polysulfide, such as a dimethyl disulfide spiked hydrocarbon stream, and hydrogen. The sulfidation can be carried out subsequent to the preparation of the bulk catalyst composition but prior to the addition of a binder, if used.

If the catalyst composition is used in a fixed bed process, sulfidation can be carried out subsequent to the shaping step. Sulfidation may be carried out ex situ or in situ. For ex situ sulfidation, sulfidation is carried out in a separate reactor prior to loading the sulfided catalyst into the hydroprocessing unit. In situ sulfidation is preferred and for in situ sulfidation the sulfidation is carried out in the same reactor used for hydroprocessing.

In an embodiment, the sulfidation can be a gas phase sulfidation process. Due to the nature of the catalyst precursor, liquid phase sulfidation methods can lead to a reduction in the mass and/or integrity of the catalyst. However, gas phase sulfidation methods have a tendency to increase the stack height of active material in a catalyst, which leads to a corresponding drop in activity. This loss in activity can be avoided by using a gas phase sulfidation method with a sulfidation temperature of 350° C. or less. This is in contrast to some conventional gas phase sulfidation methods, which are typically performed at 400° C.

In another embodiment, the sulfidation step can be a liquid sulfidation. In such an embodiment, the bulk catalyst can be sulfided by exposing the catalyst to a feedstock spiked with 1.36% by weight of dimethyl disulfide. Alternatively, the spiking level of dimethyl disulfide can be between 0.5 and 2.5% by weight. The catalyst can be exposed to the feed at a pressure of 500 psig at a LHSV of 1.0 hr$^{-1}$ and hydrogen flow rate of 700 scf/B. Preferably, the catalyst can be exposed to the feed for an initial period of time, such as 18 hours, at a temperature of 425° F. (218° C.), followed by a second period of time, such as 24 hours, at a temperature of 625° F. (329° C.). In other embodiments, other conventional methods of sulfidation can be used.

In still another embodiment involving liquid sulfidation, the catalyst can be sulfided using temperature and pressure conditions that are more severe than the expected eventual processing conditions. For example, if the sulfided catalyst will be used for processing a feedstock at a pressure of 150 psig, the sulfidation can be performed at a higher pressure to reduce the time needed to achieve sulfidation of the catalyst.

In various embodiments, the catalyst formed after sulfidation is believed to have at least in part a structure involving complexation or another interaction of metals by/with an organic compound-based component. The nature of the organic compound-based component in the sulfided catalyst may differ from the organic compound-based component in the catalyst precursor and the organic complexing agent used in the initial mixture to form the catalyst precursor. Note that in the Examples below, the carbon and sulfur species in the sulfided catalyst appear to oxidize and leave the catalyst at a similar time in Temperature Programmed Oxidation studies. One possible interpretation for these TPO studies is the presence of a complex (or some other type of interaction) between the organic compound-based component and metals in at least a portion of the catalyst structure. At least some of the association between the organic compound-based component and the organosiloxane polymer is believed to remain after sulfidation. The carbon content of the catalyst after sulfidation can be about 10 wt % to about 25 wt %, or about 10 wt % to about 20 wt %, or about 12 wt % to about 25 wt %, or about 12 wt % to about 20 wt %, or about 15 wt % to about 25 wt %, or about 15 wt % to about 20 wt %.

After sulfidation, at least a portion of the metal in the catalyst can be in a sulfided form. In particular, without being bound by any particular theory, it is believed that the Group VIB metal can form stacks of sulfided metal believed to have a $MeS_2$ stoichiometry, where Me represents the Group VIB metal. For example, if Mo is the Group VIB metal, stacks of $MoS_2$ will be formed. In catalysts formed according to the invention, the average stack height of the sulfided Group VIB metal will be from about 1.1 to about 2. In another embodiment, the average stack height will be at least 1.1, or at least 1.2, or at least 1.3, or at least 1.4, or at least 1.5. In still another embodiment, the average stack height will be 2.2 or less, or 2.1 or less, or 2.0 or less, or 1.9 or less. It is noted that each of the above lower bounds for the average stack height is explicitly contemplated in conjunction with each of the upper bounds. Without being bound by any particular theory, it is believed that a lower stack height corresponds indirectly to increased activity.

The catalyst compositions of the present invention can be suitable for hydroprocessing hydrocarbon feeds. Examples of hydroprocessing processes include hydrogenation of unsaturates, hydrodesulfurization, hydrodenitrogenation, hydrodearomatization and mild hydrocracking. Preferred are hydrodesulfurization and hydrodenitrogenation. Conventional hydroprocessing conditions include temperatures from about 250° C. to 450° C., hydrogen pressures of from 5 to 250 bar, liquid hourly space velocities of from 0.1 to 10 h$^{-1}$, and hydrogen treat gas rates of from 90 to 1780 m$^3$/m$^3$ (500 to 10000 SCF/B).

Feedstocks suitable for processing using a bulk catalyst as described herein can include petroleum feedstreams boiling in the distillate range. This boiling range can typically be from about 140° C. to about 360° C. and includes middle distillates, and light gas oil streams. Non-limiting examples of preferred distillate streams include diesel fuel, jet fuel and heating oils. Additionally or alternately, the bulk catalyst described herein can be suitable for processing of feeds including at least a portion of vacuum distillate, such as feeds having a boiling range from about 140° C. to about 500° C. The feedstocks can contain a substantial amount of nitrogen, e.g. at least 10 wppm nitrogen, and even greater than 1000 wppm, in the form of organic nitrogen compounds. The feedstocks can also contain a significant sulfur content, such as from about 0.1 wt % to 3 wt %, or higher.

Hydroprocessing can also include slurry and ebullating bed hydrotreating processes for the removal of sulfur and nitrogen compounds, and the hydrogenation of aromatic molecules present in light fossil fuels, such as petroleum mid-distillates, particularly light catalytic cycle cracked oils (LCCO). Distillates derived from petroleum, coal, bitumen, tar sands, or shale oil are likewise suitable feeds. Hydrotreating processes utilizing a slurry of dispersed catalysts in admixture with a hydrocarbon feed are generally known. For example, U.S. Pat. No. 4,557,821 discloses hydrotreating a heavy oil employing a circulating slurry catalyst. Other patents disclosing slurry hydrotreating include U.S. Pat. Nos. 3,297,563, 2,912,375, and 2,700,015. A slurry hydroprocessing process can be used to treat various feeds including mid-distillates from fossil fuels such as light catalytic cycle cracking oils (LCCO).

Hydrogenation conditions include reactions in the temperature range of about 100° C. to about 350° C. and pressures from about five atmospheres (506 kPa) and 300 atmospheres (30,390 kPa) hydrogen, for example, 10 to 275 atmospheres (1,013 kPa to 27,579 kPa). In one embodiment the temperature is in the range including 180° C. and 320° C. and the pressure is in the range including 15,195 kPa and 20,260 kPa hydrogen. The hydrogen to feed volume ratio to the reactor under standard conditions (25° C., 1 atmosphere pressure) can typically range from about is 20-200, or for water-white resins 100-200.

Process conditions applicable for the use of the catalysts described herein may vary widely depending on the feedstock to be treated. Thus, as the boiling point of the feed increases, the severity of the conditions will also increase. The following table (Table 1) serves to illustrate typical conditions for a range of feeds.

TABLE 1

Typical Feed Hydroprocessing Conditions

| Feed | Typical Boiling Range ° C. | Temp ° C. | Pressure, MPa | Space Velocity V/V/Hr | $H_2$ Gas Rate $Nm^3/m^3$ |
|---|---|---|---|---|---|
| Naphtha | 25-210 | 100-370 | 1-6 | 0.5-10 | 15-350 |
| Diesel | 170-350 | 200-400 | 1.5-10 | 0.5-4 | 85-1000 |
| Heavy gas oil | 325-475 | 260-430 | 1.5-17 | 0.3-2 | 150-1000 |
| Lube | 290-550 | 200-450 | 0.5-21 | 0.2-5 | 15-2000 |
| Resid | 10-50% > 575 | 340-450 | 6.5-110 | 0.1-1 | 350-2000 |

The following examples will serve to illustrate, but not limit this invention.

EXAMPLES

Example 1A

Catalyst Precursor Synthesis (Glyoxylic Acid)

Bulk CoMo catalysts were prepared by a controlled heating process according to an embodiment of the invention. A 1 M Mo aqueous solution was prepared by dissolving the appropriate amount of ammonium heptamolybdate tetrahydrate (AHM) in distilled water. A 1 M Co aqueous solution was also prepared by dissolving the appropriate amount of cobalt acetate tetrahydrate in distilled water. A 4.5 M glyoxylic acid solution was prepared by a 1:1 dilution with distilled water of 50% glyoxylic acid aqueous solution.

A mixture was prepared by mixing together appropriate amounts of the above three solutions. The resulting solution had a reddish color. The ratio of Mo to Co in the solution was 2:1. Two bulk catalyst precursor mixtures were prepared. One catalyst precursor mixture had a molar ratio of glyoxylic acid/(Mo+Co) of 4.8, and is designated Catalyst Precursor A. A second catalyst precursor mixture designated Catalyst Precursor B was prepared having a molar ratio of glyoxylic acid/(Mo+Co) of 6. The catalyst precursor mixtures were heated at 55° C. for about 4 hours, then at 120° C. for about an additional 4 hours. The result for each catalyst precursor was a black viscous substance. The black viscous substance was then cooled to room temperature wherein it solidified. The solidified black substance was ground to a powder and placed in a tube furnace whereupon the temperature was ramped from about room temperature to about 325° C. in one hour. The catalyst precursor compositions were then heated at a temperature of about 325° C. in air for about 4 hours.

Samples of the two catalyst precursor powders were crushed into fines using an agate mortar and pestle. A portion of the precursor powders were sulfided to produce catalyst powder.

The BET surface area and carbon content were measured for the catalyst precursor compositions of Catalyst Precursor A and Catalyst Precursor B as well as for a CoMo catalyst precursor prepared similarly, but without the use of an organic acid (Comparative Catalyst 1). The results are shown in Table 2 below. X-ray diffraction showed that both samples of the bulk catalyst precursors of the present invention were amorphous in character, and do not exhibit the long range order typically observed in XRD when large particles of crystallized phases are present. The X-ray diffraction pattern for Comparative Catalyst 1 showed crystallized $MoO_3$ and $CoMoO_4$, which are typically regarded as undesirable catalyst precursors for hydrotreating processes. It is believed that residual carbon inside the catalyst precursors of the present invention interrupts the crystallization of CoMo oxides so that CoMo oxide crystals either are not present or are present as small crystals that introduce little or no crystalline character into XRD spectra.

TABLE 2

Catalyst Precursor Characterization

| Catalyst | BET SA ($m^2/g$) | Carbon Content (wt %) |
|---|---|---|
| Catalyst Precursor B CoMo-6-Gly | 15.6 | 23.8 |
| Catalyst Precursor A CoMo-4.8-Gly | <1 | 21.9 |
| Comparative Catalyst 1 CoMo prepared without Organic Acid | 20 | 0.22 |

It can be seen from Table 2 above that the bulk CoMo-6-Gly and CoMo-4.8-Gly catalyst precursors had relatively low surface areas. In particular, Catalyst Precursor A had a surface area less than 1 $m^2/g$. After heating, both Catalyst Precursor A and Catalyst Precursor B contained substantial amounts of carbon of about 22 to 24 wt %. The carbon content of the catalyst precursors is a function of the heating conditions the catalysts experienced, i.e., the time and the temperature of the heating profile, as well as the ratios of glyoxylic acid/(Mo+Co) metal. The carbon content in the bulk CoMo catalyst precursors influences the morphology of the CoMo in such precursors and the resulting hydrodesulfurization catalytic activities of the sulfided catalysts.

Example 1B

Catalyst Precursor Synthesis (Glyoxylic Acid)

1 M solutions of ammonium heptamolybdate tetrahydrate and cobalt acetate tetrahydrate were used to form additional catalyst precursors. A solution containing 5.7 wt % AHM, 4.0 wt % Co Acetate, and 17.3 wt % glyoxylic acid was formed by mixing appropriate amounts of the 1 M Mo and Co solutions with a solution containing 25 wt % of glyoxylic acid. The molar ratio of R/(Co+Mo) was 4.8. After heating, the solution yield to solid was about 8.6%.

Separately, a solution containing 12.8 wt % AHM, 9.1 wt % Co Acetate, and 39.1 wt % glyoxylic acid was formed by mixing appropriate amounts of the 1 M Mo and Co solutions with a solution containing 50 wt % of glyoxylic acid. The molar ratio of R/(Co+Mo) was 4.8. After heating, the solution yield to solid was about 19.4%.

Example 1C

Catalyst Precursor Synthesis (Glyoxylic Acid)

This example is directed to the synthesis of bulk trimetallic NiCoMo. A bulk trimetallic NiCoMo catalyst was prepared by a controlled heating process according to the invention. 200 mg NiO, 200 mg $Co(OH)_2$ and 1 g $H_2MoO.sub.4$ were each dissolved/suspended in water in separate containers. A 50 wt % glyoxylic acid solution was added to each container such that the concentration of acid in each container was 15 wt %. The Ni, Co, and Mo solutions were combined and 6 ml 30% $H_2O_2$ added to the combined solution. The sample was heated at 250 C for 4 hours to yield the bulk trimetallic NiCoMo catalyst precursor.

Example 2

Catalyst Precursor Characterization (Glyoxylic Acid)

An X-ray Diffraction (XRD) analysis was performed on a CoMo based catalyst precursor synthesized according to an embodiment of the invention. The resulting XRD spectrum is shown in FIG. 1. As shown in FIG. 1, the CoMo based catalyst precursor had an amorphous XRD spectrum. It is believed that the organic compound-based component in the CoMo catalyst precursor interrupts the crystallization process, resulting in a CoMo catalyst precursor that does not have a detectable crystalline phase. In an alternative embodiment of the invention, a crystalline phase may be detectable in a catalyst precursor, but only as a portion of the catalyst precursor, resulting in XRD spectra with some crystalline character and some amorphous character. This is in contrast to the XRD spectrum of a bulk CoMo material (Comparative Catalyst 1) that was prepared without using an organic complexing agent, but that was otherwise prepared similarly to the catalyst precursors of the invention. The XRD spectrum for the bulk comparative CoMo material showed a crystalline morphology, including peaks that appear to represent $MoO_3$ and $CoMoO_4$.

Example 3

Temperature Programmed Oxidation of Catalyst Precursor

Figure 2A:
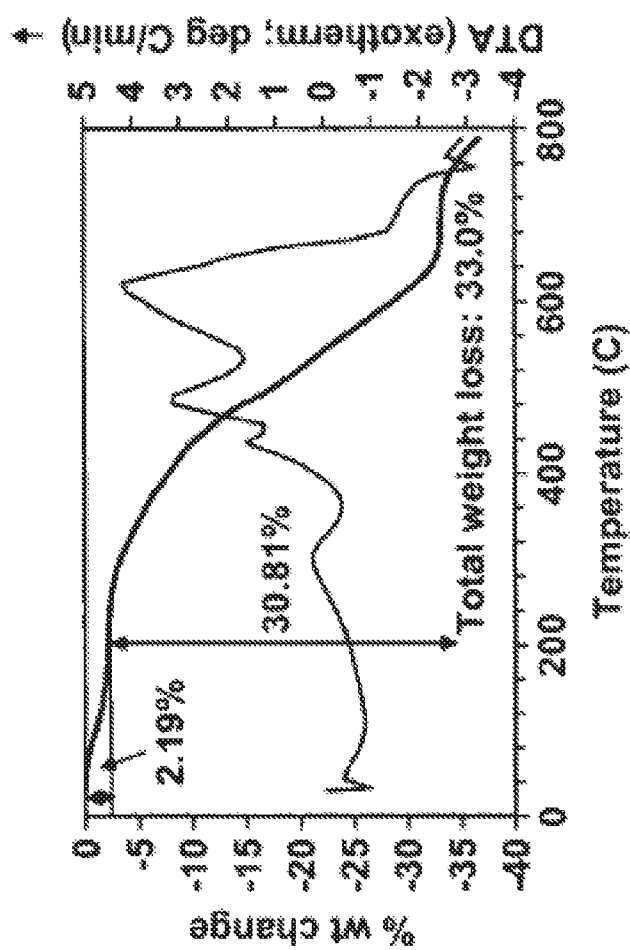
FIGS. 2A and 2B provide data related to a Temperature Programmed Oxidation (TPO) analysis of a catalyst precursor according to an embodiment of the invention.
Figure 2B:
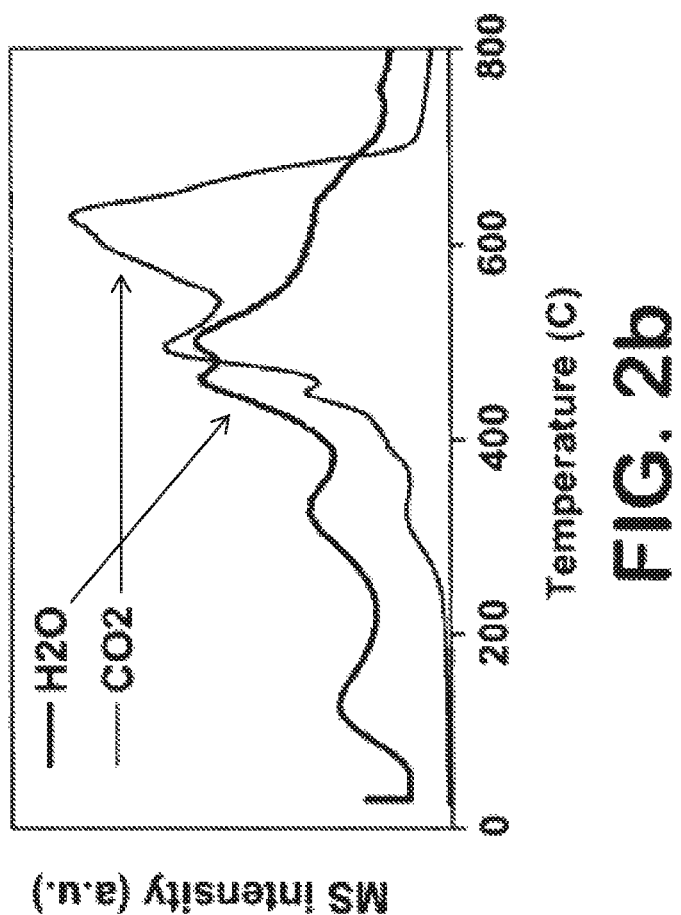

A temperature programmed oxidation (TPO) study was carried out to understand the nature of organic compound-based component of a catalyst precursor synthesized according to the procedure for Catalyst A in Example 1. FIG. 2A shows that the catalyst precursor loses about 30 wt % of weight as the catalyst precursor is exposed to increasing temperatures up to 650° C. FIG. 2B shows a mass spectrometry characterization of the products generated from the catalyst precursor sample as a function of temperature. The primary products generated during the TPO study were $CO_2$ and $H_2O$. Based on FIGS. 2A and 2B, it is believed that at 650° C. all of the carbon has been removed from the catalyst precursor sample. The TPO study, in combination with the Temperature Programmed Reduction study described in Example 4, indicates that the organic compound-based component is composed of at least carbon, hydrogen, and oxygen.

Example 4

Temperature Programmed Reduction of Catalyst Precursor

Figure 3A:
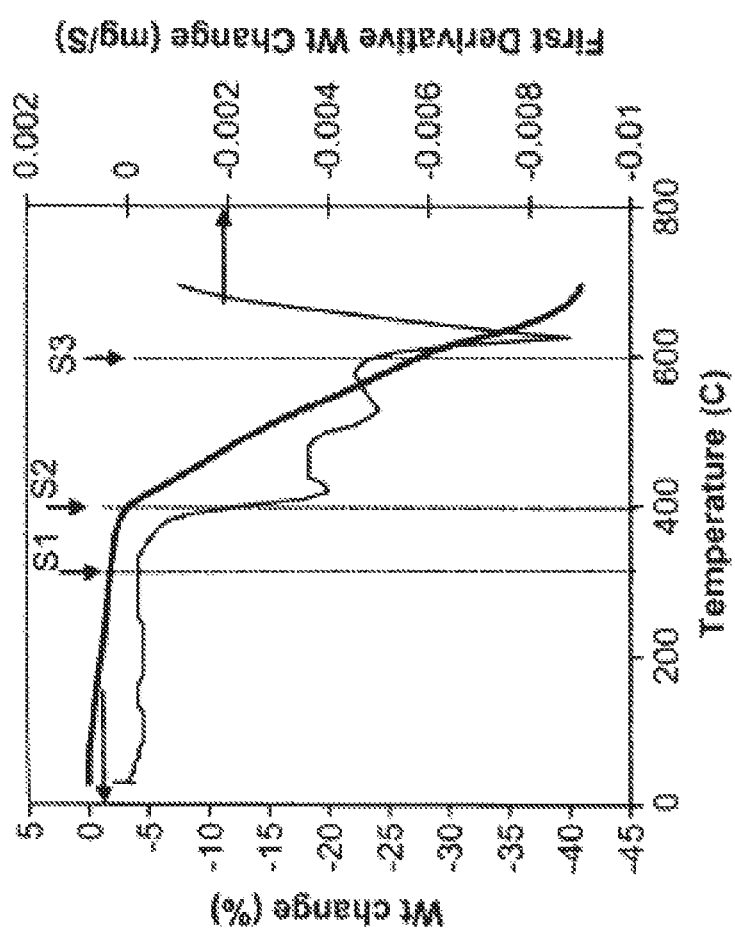
FIGS. 3A and 3B provide data related to a Temperature Programmed Reduction ($H_2$-TPR) analysis of a catalyst precursor according to an embodiment of the invention.
Figure 3B:
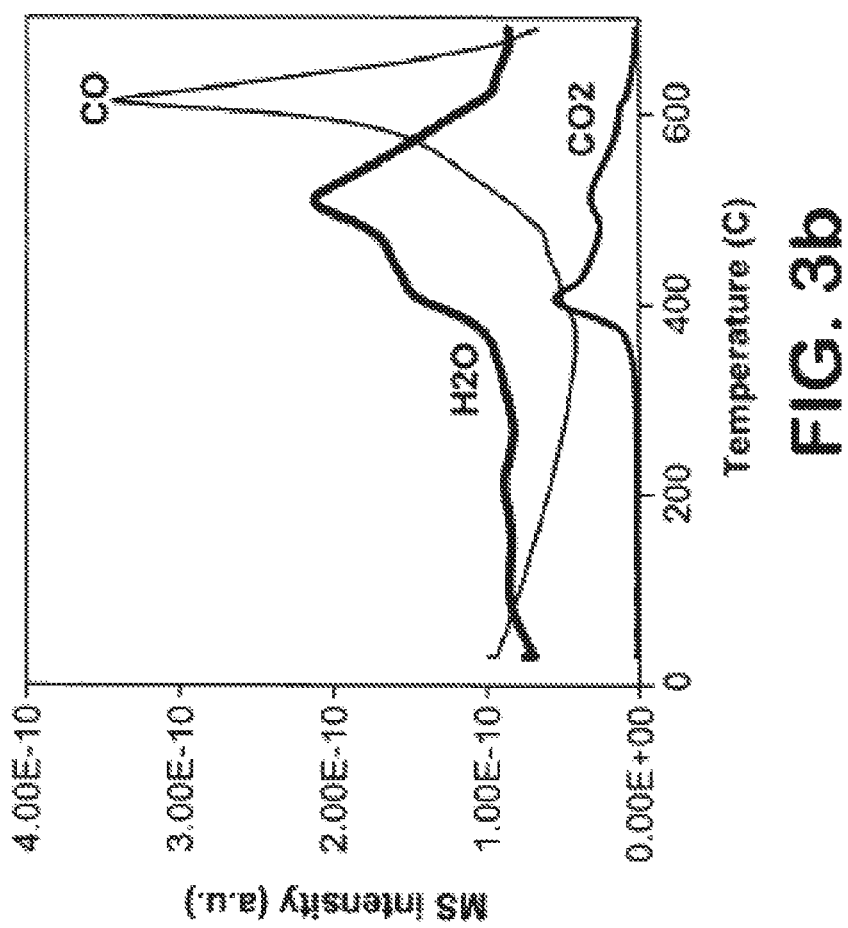

FIG. 3 shows the results from a Temperature Programmed Reduction analysis ($H_2$-TPR) of a catalyst precursor synthesized according to the procedure for Catalyst Precursor A in Example 1. The $H_2$-TPR analysis was carried out in a 5% $H_2$/He atmosphere, with a temperature change rate of 10° C. per minute. The results of the $H_2$-TPR study are shown in FIGS. 3A and 3B. FIG. 3A shows the total weight loss as measured by thermo-gravimetric analysis. By the time the sample reached 700° C., almost 40% of the weight of the precursor sample was removed. As shown in FIG. 3B, this weight loss was in the form of $H_2O$, $CO_2$, and CO released from the precursor sample. The species released from the sample are believed to represent removal of the organic compound-based component and/or conversion of some metal oxides into lower oxidation states.

Note also that FIGS. 2A, 2B, 3A, and 3B indicate that removal of the organic compound-based component is minimal until a temperature near 400° C. is achieved. Based on this, it is preferred that sulfidation of catalyst precursors, which also occurs in a reducing environment, should take place at a temperature of less than about 400° C., preferably less than about 350° C. For example, one preferred sulfidation temperature is about 325° C.

Example 5

Characterization of Activity Relative to Organic Content

FIG. 4 shows the relative activity of bulk CoMo catalysts created using varying amounts of organic complexing agent. The data in FIG. 4 was generated by creating various catalyst precursors using glyoxylic acid as the organic complexing agent. As shown in FIG. 4, catalyst precursors having a ratio of organic complexing agent to metal of less than about 2:1 result in catalysts with a substantially lower activity. Catalysts with a organic complexing agent to metal ratio of greater than about 2:1, and preferably greater than about 3:1, exhibit a relative activity that is 4 to 6 times greater than the activity of the catalysts with a ratio below about 2:1.

Example 6

Catalyst Precursor Synthesis (Gluconic Acid)

Solutions for forming bulk catalyst precursor were prepared according to the following procedure. An appropriate amount of ammonium heptamolybdate and cobalt acetate tetrahydrate were dissolved in a 48.6% gluconic acid aqueous solution. In the mixture solutions, the molar ratio of Mo/Co was kept at 2. The molar ratio of gluconic acid/(Mo+Co) was adjusted to 0.5 in the solutions. The solutions were vacuum dried at 55° C. for 4 hours, then 120° C. for additional 4 hours. Black viscous solutions were formed after drying at 120° C. for 4 hrs. After the solutions were taken out from drying oven and cooled down to room temperature, the black viscous solutions became solidified. After grinding, the black solids were placed in a box furnace. The furnace was ramped from room temperature to 752° F. (400° C.) at rate of 10° F./min in the nitrogen flow at 5 vol/vol cat/min rate. The samples were held at 752° F. (400° C.) for 4 hrs in nitrogen. The resulting sample without further impregnation corresponds to Catalyst Precursor 6A.

The bulk catalyst precursor powders were then impregnated with various organo-siloxanes. The selected organo-siloxanes were Dow 550®, which corresponds to polydimethylsiloxane-co-methylphenylsiloxane; hexamethyldisiloxane; and Dynsylan® Hydrosil 2627 available from Evonik. The bulk catalyst precursor powders were impregnated according to the following procedures.

For one type of impregnated bulk catalyst precursor (Catalyst Precursor 6B), polydimethylsiloxane-co-methylphenylsiloxane Dow 550® was deposited on bulk catalyst precursor powder by impregnation with a solution of Dow 550® dissolved in decane. After impregnation, the sample was vacuum-dried at room temperature overnight. Then the sample was vacuum-dried at 160° F. overnight to remove any decane solvent before calcination. The sample was then placed inside a box furnace. The furnace was ramped from room temperature to 752° F. (400° C.) at rate of 10° F./min in the nitrogen flow at 5 vol/vol cat/min. The samples were then held at 752° F. (400° C.) for 4 hrs in nitrogen. The silica content in the resulting catalyst precursor powder sample was targeted at about 10 wt % as $SiO_2$.

For another type of bulk catalyst precursor (Catalyst Precursor 6C), hexamethyldisiloxane (HMDS) was deposited on the bulk catalyst precursor powder in a manner similar to the procedure used for impregnation of the Dow 550®. HMDS was dissolved in cyclohexane solvent to make the impregnation solution. The silica content in the resulting catalyst precursor powder sample was targeted at about 10 wt % as $SiO_2$.

For another type of bulk catalyst precursor (Catalyst Precursor 6D), Dynsylan® Hydrosil 2627 is an aminofunctional oligomeric siloxane that is soluble in water. Hydrosil 2627 was deposited on CoMoC in a manner similar to the procedure described for Dow 550®. However, the Hydrosil 2627 was dissolved in water to prepare the impregnation solution. The silica content in the resulting catalyst precursor powder sample was targeted at about 10 wt % as $SiO_2$.

An additional bulk catalyst precursor (Catalyst Precursor 6E) was prepared using a method that incorporated the Hydrosil 2627 into the solutions used for forming the bulk catalyst precursor.

To form Catalyst Precursor 6E, two solutions were prepared and then mixed. Solution 1 was prepared by dissolving an appropriate amount of ammonium heptamolybdate and cobalt acetate tetrahydrate in a 48.6% gluconic acid aqueous solution. In Solution 1, the molar ratio of Mo/Co was kept at 2. The molar ratio of gluconic acid/(Mo+Co) was adjusted to 0.5. Solution 2 was prepared by dissolving an appropriate amount of Dynsylane® Hydrosil 2627 in an equal amount of water. The mixture solution of CoMo-gluconic acid (Solution 1) was slowly added into the solution of Hydrosil 2627/water (Solution 2) with stirring. The resulting mixture was vacuum dried at 55° C. for 4 hours, then was kept at 120° C. for additional 4 hours, resulting in a black viscous solution. After the solution was taken out from drying oven and cooled down to room temperature, the black viscous solution became solidified. After grinding, the black solids were placed in a box furnace. The furnace was ramped from room temperature to 752° F. (400° C.) at rate of 10° F./min in the nitrogen flow of 5 vol/vol cat/min. The sample was held at 752° F. (400° C.) for 4 hrs. The silica content in the sample was targeted at 10 wt % as $SiO_2$.

After forming the catalyst precursor powders, some powders were used to form bound catalyst precursors. For bound samples, the powders of were broken up with mortar and pestle for 20 minutes. The fines between 50 and 170 mesh sieves (297-88 microns) were collected for binding and formulation. The binders used for catalyst formulation studies were polyethyleneglycol (combined with Catalyst Precursor 6E to form Catalyst Precursor 6F) and silica resin (combined with Catalyst Precursor 6D to form Catalyst Precursor 6G). The amount of the binder used for binding was about 10 wt % of the total sample weight. The sample was pressed at 30 tons for 10 minutes to form a sample disc. Then the sample disc was broken up into particles sieved between 14/25 mesh (1410/710 micron). The bound particles were calcined in nitrogen at 752° F. (400° C.) for 4 hours. The $N_2$ flow rate was controlled at 5 volume/volume catalyst/minute.

Example 7

Catalyst Precursor Stability in LCCO Solvent

The various Catalyst Precursor Powders 6A-6E and additional bound versions of some powders were tested for stability under a solvent extraction process using a light catalytic cycle oil (LCCO) as the solvent. A light catalytic cycle oil is believed to correspond to a strong solvent relative to other types of light distillate boiling range feeds.

The particles between 14/25 mesh sizes for the various catalyst precursor types (6A-6E and some corresponding bound versions) were sieved gently to remove any loose dust. One gram of sample was weighed accurately with 4 digit precision, for example, 1.0001 g. The sample was then loaded into a filter basket housed inside a glass beaker. The basket containing the sample was immersed in the LCCO solvent with a magnetic stirring underneath. The system was heated to 250° F. on a temperature-controlled hot plate inside a fume hood and stayed at this temperature for 24 hours. The basket was removed from the LCCO solvent and cooled down to room temperature. After the removals of solids, the samples of LCCO solvents were sent for ICP-MS for Co and Mo elemental analyses. This allowed for determination of the stability of the catalysts precursor particles based on the amount of Co and/or Mo lost to the LCCO solvent during the test procedure.

Figure 5:
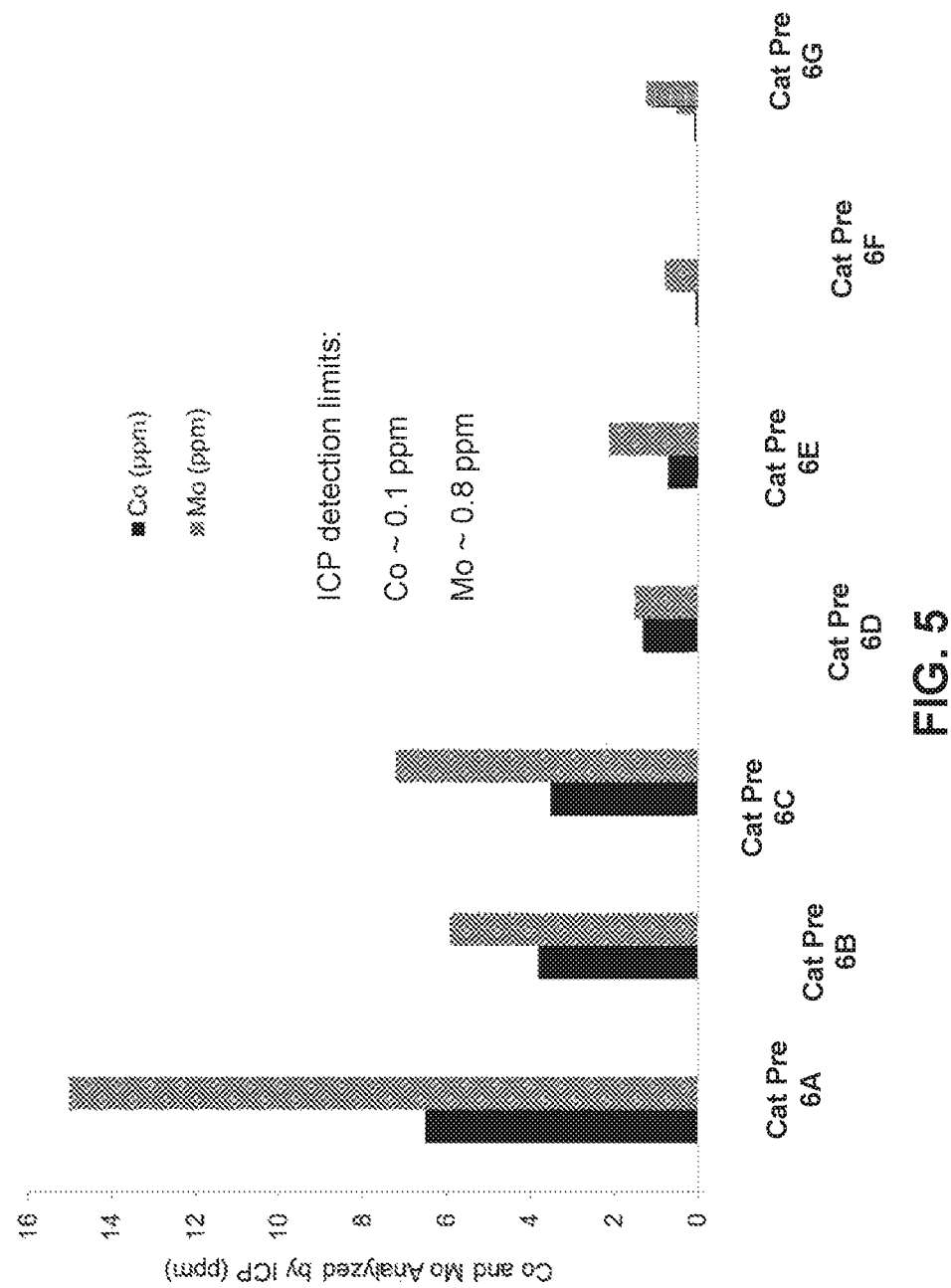
FIG. 5 shows amounts of metal solvated after exposing bulk metallic catalyst precursors to a light catalytic cycle oil.

FIG. 5 shows the results from the solvent extraction of Co and Mo using LCCO as the solvent. The LCCO solvent extraction is believed to simulate and/or be more aggressive than the diesel HDS processing environment that would typically be encountered by bulk catalysts as described herein. The sample made with gluconic acid without silica framework (Catalyst Precursor 6A) resulted in about 15 ppm Mo and about 6.5 ppm Co dissolved in the LCCO solvent. Addition of silica by polydimethylsiloxane-co-methylphenylsiloxane (Catalyst Precursor 6B) and hexamethyldisiloxane (Catalyst Precursor 6C) cut down the dissolved Co and Mo concentrations in LCCO solvent by about 50%. Co concentrations in LCCO were about 3.5~3.8 ppm and Mo concentrations were about 5.9~7.2 ppm. However, addition of water soluble Hydrosil 2627 either by post impregnation (Catalyst Precursor 6D) or by adding Hydrosil 2627 to the mixture of Co, Mo and gluconic acid (Catalyst Precursor 6E) substantially reduced the dissolved Co and Mo in the LCCO solvent. The Co concentrations in LCCO for Catalyst Precursors 6D and 6E were about 0.7~1.3 ppm, and Mo concentrations were about 1.5~2.1 ppm. Based on FIG. 5, it appears that the water soluble organo-siloxane polymer is more effective for improving catalyst stability in LCCO solvent. When Catalyst Precursor 6E was bound with 10 wt % polyethyleneglycol (Catalyst Precursor 6F) or when Catalyst Precursor 6D was bound with 10 wt % silica resin (Catalyst Precursor 6G), Co and Mo leaching into the LCCO solvent appeared to stop, as the Co and Mo concentrations were below ICP-MS detection limits, for example, Co~0.1 ppm, Mo~0.8 ppm. This demonstrates that the combination of incorporating an organo-siloxane polymer into the bulk catalyst precursor and binding the resulting catalyst precursor can lead to a catalyst with improved long term stability.

Example 8

Catalyst Properties and Activity for Diesel Hydrodesulfurization

Catalysts based on the precursors described above were tested for diesel hydrodesulfurization and hydrodenitrogenation activity using TPR (Three Phase Reactor) units. The TPR units were continuous flow, fixed-bed reactors, which have 8 reactors immersed in a sand bath. A syringe pump delivered steady flow of diesel feed into the reactors. A flow meter controlled the flow of $H_2$ treat gas. During the hydrotreatment test runs, liquid feed was mixed with $H_2$ treat gas and flowed through the catalyst bed in an up-flow mode. The reactor pressure was controlled by pressure regulator. The liquid and gas products from the reactors were separated by product accumulators. Liquid products were collected in the bottom of the accumulators while gas products exited through the top of the accumulators. A pressure regulator controlled the backend pressure. Product liquid was stripped in a fume hood with $N_2$ for 1 hour to remove dissolved $H_2S$.

The S and N concentrations in the products were analyzed. 1.5 order kinetics were used to calculate HDS rate constants, assuming that reactivity of S compounds in the feed is a function of continuous distribution of S species. The 1.5 order kinetic model has limitations when S concentrations in the feed are low. HDN rate constants were calculated as 1st order, assuming that reactivity of all N species in the feed are equivalent. The kinetic equations used for calculations were:

$$kHDS = LHSV*(1/\sqrt{S_{product}} - 1/\sqrt{S_{feed}})*C \quad \text{(1.5 order)},$$

C=100 was used as the constant for this calculation $$kHDN = LHSV*\ln(N_{feed}/N_{product}) \quad \text{(1st order)}$$

During the tests, 1 cc of the catalyst with particle sizes between 90 and 300 microns was charged in the reactor. Note that although a volume of catalyst is specified, the volume was determined based on a catalyst weight. The catalyst was sandwiched between two layers of inert material of silicon carbide inside a U-type reactor. All the diesel HDS catalysts (see Table 3) were sulfided using a diesel feed that was spiked with an additional 2.3 wt % of sulfur in the form of DMDS. The catalysts were sulfide using the spiked diesel feed at 450° F. for 20 hrs with 450 psig $H_2$ pressure, and another 20 hrs at 610° F. The total S in the spiked diesel feed was 2.5 wt %, based on a 0.2 wt % sulfur content originally present in the feed and the 2.3 wt % of sulfur added by spiking with DMDS. The bulk catalysts shown in Table 3 correspond to catalysts made from Catalyst Precursors 6E-6G. The bulk catalysts are therefore referred to as Catalysts 6E-6G. Table 3 also shows the loading volume and corresponding weight for a commercially available supported CoMo catalyst that was used as a reference catalyst.

TABLE 3

Catalysts Loaded in TPR unit

| Catalyst | Volume, cm³ | Weight, g |
| --- | --- | --- |
| Cat Pre 6E | 1.0 | 0.98 |
| Cat Pre 6F | 1.0 | 0.92 |
| Cat Pre 6G | 1.0 | 0.97 |
| Reference | 1.0 | 0.90 |

The catalyst evaluation conditions were an LHSV=1 hr$^{-1}$, about 220 or about 500 psig $H_2$ pressure, a temperature of about 338° C. (640° F.), and a treat gas rate of about 1000 SCF/B $H_2$. The diesel feed used for catalyst evaluations contained about 2000 wppm S and 62.8 wppm N. The diesel feed had an API gravity of about 35.05, and had a T95 distillation point of about 680.8° F. The feed contained about 25.1 wt % aromatics with about 0.9 wt % of three ring aromatics.

Table 4 shows that the bulk catalyst precursors had very low surface areas, with all of the catalyst precursors having a surface area of less than about 1 m²/g. After calcination in nitrogen, all catalysts contained substantial amounts of carbon corresponding to about 22 wt % to 23 wt %. No crystallized phases were detected by XRD, indicating the catalysts were amorphous with respect to the detection limit of XRD. Without being bound by any particular theory, it is believed that residual carbon incorporated inside catalysts may interrupt the crystallization of CoMo oxides, or small crystals of Co and Mo oxides may be framed in the carbon matrix. All the catalysts contained about 14-16% Co, and about 48-53% Mo. The silica contents are less than the target loading of 10 wt %.

TABLE 4

Surface Areas, Carbon Contents, and XRD Results

| Sample | BET SA (m²/g) | C Content (wt %) | Co, Mo, Si by XRF | XRD |
| --- | --- | --- | --- | --- |
| Cat Pre 6A | <1 | 23.3 | 14.9 Co, 53.6 Mo | amorphous |
| Cat Pre 6B | <1 | 23.1 | 14.5 Co, 48.3 Mo, 8.8 SiO₂ | amorphous |
| Cat Pre 6C | <1 | 22.4 | 16.0 Co, 52.6 Mo, 0.1 SiO₂ | amorphous |
| Cat Pre 6D | <1 | 22.8 | 13.5 Co, 49.5 Mo, 8.1 SiO₂ | amorphous |

TABLE 4-continued

Surface Areas, Carbon Contents, and XRD Results

| Sample | BET SA (m²/g) | C Content (wt %) | Co, Mo, Si by XRF | XRD |
|---|---|---|---|---|
| Cat Pre 6E | <1 | 21.9 | 14.1 Co, 50.6 Mo, 5.6 SiO$_2$ | amorphous |

Figure 6:
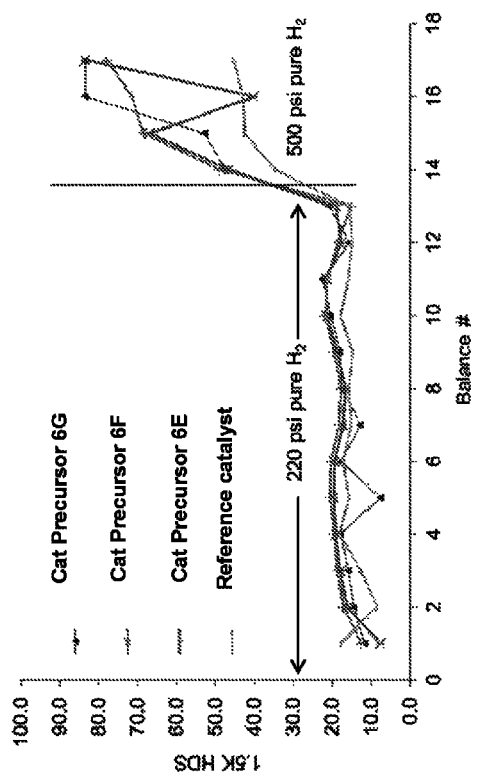
FIG. 6 shows hydrodesulfurization activities for sulfided bulk metallic catalysts and a reference catalyst at various temperatures.

FIG. 6 shows the volumetric 1.5 order HDS activities of the catalysts shown in Table 3, and a commercially available supported hydrotreating catalyst at 220 psig H$_2$ and 500 psig H$_2$. Although only Catalysts 6E, 6F, and 6G are shown, the activities for Catalysts 6B, 6C, and 6D were similar to the depicted bulk catalyst results. As shown in FIG. 6, HDS activities were continuously improving on oil as carbon species were dissolving and leaching out. This activation process appeared to create catalyst surface areas, porosities, and HDS active sites. It can be seen from FIG. 6 that the bulk catalyst HDS activities were about 30~40% higher than the reference supported catalyst at 220 psi H$_2$, and about 80~100% higher than the reference supported catalyst at 500 psi H$_2$.

Figure 7:
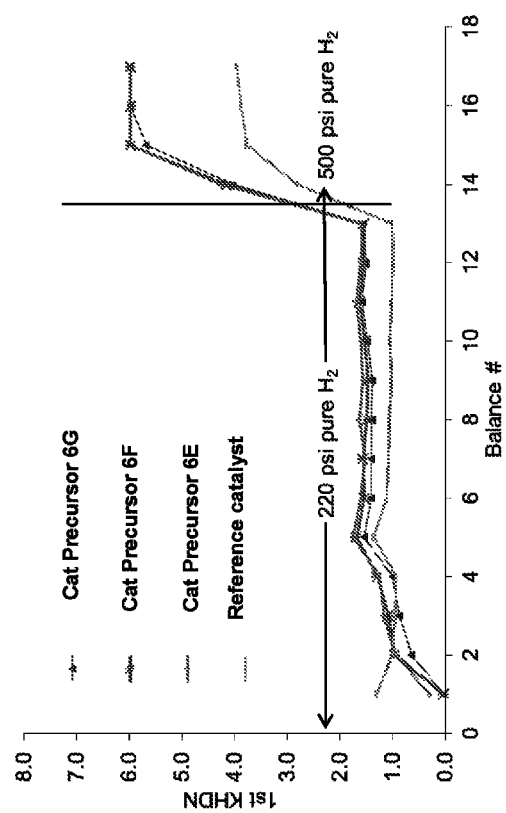
FIG. 7 shows hydrodenitrogenation activities for sulfided bulk metallic catalysts and a reference catalyst at various temperatures.

FIG. 7 shows the 1st order volumetric HDN activities of the catalysts shown in Table 3 and the reference supported catalyst at 220 and 500 psi H$_2$. The HDN activities of the bulk catalysts were similar to each other, and the bulk catalyst HDN activities appeared to be more stable than the corresponding HDS activities. At 200 psi H$_2$ pressure, HDN activities were about 40-60% higher than the reference supported catalyst, and at 500 psi H$_2$ pressure, about 50-60% higher than the reference supported catalyst.

It is noted that at 500 psi H$_2$ pressure, the N contents in the products were less than about 5 wppm. The accuracy limit of the analysis method for N content was about 1 ppm. Thus, any error in the nitrogen content analysis due to being near the detection limit could amplify the differences of the kinetic constants.

ADDITIONAL EMBODIMENTS

Additionally or alternately, the present invention can include one or more of the following embodiments.

Embodiment 1

A bulk metallic catalyst precursor composition comprising: a Group VIII metal; a Group VIB metal, a combined amount of Group VIII metal and Group VIB metal being about 1 wt % to about 80 wt % on a metal oxide basis; about 10 wt % to about 60 wt % of an organic compound-based component, the organic compound-based component is based on at least one organic complexing agent; and about 1 wt % to about 50 wt % of an (optionally water soluble) organo-metalloxane polymer, organo-metalloxane gel, or combination thereof, the catalyst precursor composition having a surface area of 20 m²/g or less based on BET.

Embodiment 2

The bulk metallic catalyst precursor composition of Embodiment 1, wherein the organic compound-based component is further based on organic functional groups from the organo-metalloxane polymer, organo-metalloxane gel, or combination thereof, and/or wherein the organo-metalloxane polymer, organo-metalloxane gel, or combination thereof is introduced into the bulk metallic catalyst precursor as part of a solution for forming the bulk metallic catalyst precursor.

Embodiment 3

An amorphous sulfided bulk metallic catalyst comprising: a Group VIII metal; a Group VIB metal; at least about 10 wt % carbon; and about 1 wt % to about 50 wt % of an (optionally water soluble) organo-metalloxane polymer, organo-metalloxane gel, or combination thereof, the catalyst being formed by sulfiding a catalyst precursor composition having a surface area of 20 m²/g or less based on BET, the catalyst optionally comprising a combined amount of Group VIII metal and Group VIB metal of about 1 wt % to about 80 wt %, on a metal oxide basis.

Embodiment 4

The amorphous sulfided bulk metal catalyst of Embodiment 3, wherein the catalyst is formed by sulfiding a catalyst precursor composition comprising the Group VIII metal, the Group VIB metal, about 10 wt % to about 60 wt % of an organic compound-based component, and the organo-metalloxane polymer, organo-metalloxane gel, or combination thereof.

Embodiment 5

The amorphous sulfided bulk metallic catalyst or bulk metallic catalyst precursor composition of any of the above embodiments, wherein the catalyst or catalyst precursor composition comprises at least about 2 wt % of the organo-metalloxane polymer, organo-metalloxane gel, or combination thereof, or at least about 5 wt %, or at least about 10 wt %, and/or about 30 wt % or less, or about 20 wt % or less.

Embodiment 6

The amorphous sulfided bulk metallic catalyst or bulk metallic catalyst precursor composition of any of the above embodiments, wherein the organo-metalloxane polymer, organo-metalloxane gel, or combination thereof comprises an organo-siloxane, an organo-alumoxane, an organo-titanoxane, or a combination thereof.

Embodiment 7

The amorphous sulfided bulk metallic catalyst or bulk metallic catalyst precursor composition of any of the above embodiments, wherein the organo-metalloxane polymer, organo-metalloxane gel, or combination thereof comprises at least one of zirconium, lanthanum, yttrium, or a rare earth metal.

Embodiment 8

The amorphous sulfided bulk metallic catalyst or bulk metallic catalyst precursor composition of any of the above embodiments, of any of the above embodiments, wherein the organo-metalloxane polymer, organo-metalloxane gel, or combination thereof comprises an organo-siloxane polymer, the organo-siloxane polymer optionally further comprising silane monomers, the organo-siloxane polymer optionally having functional groups comprising amines.

Embodiment 9

The amorphous sulfided bulk metallic catalyst or bulk metallic catalyst precursor composition of any of Embodiments 1-7, wherein the organo-metalloxane polymer, organo-metalloxane gel, or combination thereof comprises an organo-alumoxane polymer, organo-alumoxane gel, or combination thereof, the organo-alumoxane polymer, organo-alumoxane gel, or combination thereof optionally having functional groups comprising carboxylates.

Embodiment 10

The amorphous sulfided bulk metallic catalyst or bulk metallic catalyst precursor composition of any of the above embodiments, wherein a) the catalyst or catalyst precursor composition further comprises a binder, the binder optionally comprising a silica polymer, polyethylene glycol, or a combination thereof; b) the catalyst precursor composition is extruded with a binder to form an extruded composition having a surface area of 30 m$^2$/g or less, or 20 m$^2$/g or less; or c) a combination of a) and b).

Embodiment 11

An amorphous sulfided bulk metallic catalyst comprising a sulfided form of the bulk metallic catalyst precursor composition of any of Embodiments 1-2 or 5-10, optionally wherein gas-phase sulfidation at a temperature of 350° C. or less is used on the bulk metallic catalyst precursor composition to form the sulfided bulk metallic catalyst.

Embodiment 12

The amorphous sulfided bulk metallic catalyst of any of Embodiments 3-11, which contains regions of MeS$_2$ having stack heights averaging about 1.1 to 2.5, wherein Me represents a Group VIB metal, the stack heights optionally averaging about 2.2 or less, or about 2.0 or less.

Embodiment 13

The sulfided bulk metallic catalyst or bulk metallic catalyst precursor composition of any of the above embodiments, wherein the Group VIII metal is nickel, cobalt, or a combination thereof, and/or wherein the Group VIB metal is molybdenum, tungsten, or a combination thereof, the Group VIII metal optionally being cobalt, the Group VIB metal optionally being molybdenum.

Embodiment 14

The sulfided bulk metallic catalyst or bulk metallic catalyst precursor composition of any of the above embodiments, wherein the surface area of the catalyst precursor composition is less than about 16 m$^2$/g, or less than about 10 m$^2$/g, or less than about 5 m$^2$/g, or less than about 1 m$^2$/g.

Embodiment 15

The sulfided bulk metallic catalyst or bulk metallic catalyst precursor composition of any of the above embodiments, further comprising an additional transition metal, the additional transition metal optionally being Co, Ni, Zn, or a combination thereof.

Although the present invention has been described in terms of specific embodiments, it is not so limited. Suitable alterations/modifications for operation under specific conditions should be apparent to those skilled in the art. It is therefore intended that the following claims be interpreted as covering all such alterations/modifications as fall within the true spirit/scope of the invention.

What is claimed is:

1. A bulk metallic catalyst precursor composition comprising:
    a Group VIII metal;
    a Group VIB metal, a combined amount of Group VIII metal and Group VIB metal being about 1 wt % to about 80 wt % on a metal oxide basis;
    about 10 wt % to about 60 wt % of an organic compound-based component, the organic compound-based component is based on at least one organic complexing agent; and
    about 1 wt % to about 50 wt % of an organo-metalloxane polymer, organo-metalloxane gel, or combination thereof,
    the catalyst precursor composition having a surface area of 20 m$^2$/g or less based on BET.

2. The bulk metallic catalyst precursor composition of claim 1, wherein the catalyst precursor composition comprises at least about 5 wt % of the organo-metalloxane polymer, organo-metalloxane gel, or combination thereof.

3. The bulk metallic catalyst precursor composition of claim 1, wherein the organic compound-based component is further based on organic functional groups from the organo-metalloxane polymer, organo-metalloxane gel, or combination thereof.

4. The bulk metallic catalyst precursor composition of claim 1, wherein the organo-metalloxane polymer, organo-metalloxane gel, or combination thereof is water soluble.

5. The bulk metallic precursor composition of claim 1, wherein the organo-metalloxane polymer, organo-metalloxane gel, or combination thereof comprises an organo-siloxane, an organo-alumoxane, an organo-titanoxane, or a combination thereof.

6. The bulk metallic precursor composition of claim 1, wherein the organo-metalloxane polymer, organo-metalloxane gel, or combination thereof comprises an organo-siloxane polymer, and wherein at least a portion of the organic functional groups of the organo-siloxane polymer comprise amines.

7. The bulk metallic catalyst precursor composition of claim 1, wherein the organo-metalloxane polymer, organo-metalloxane gel, or combination thereof comprises an organo-alumoxane polymer, organo-alumoxane gel, or combination thereof.

8. The bulk metallic catalyst precursor composition of claim 7, wherein at least a portion of the organic functional groups of the organo-alumoxane polymer, organo-alumoxane gel, or combination thereof comprise carboxylates.

9. The bulk metallic catalyst precursor composition of claim 1, wherein the catalyst precursor composition further comprises a binder, the binder comprising a silica polymer, polyethylene glycol, or a combination thereof.

10. The bulk metallic catalyst precursor composition of claim 1, wherein the organo-metalloxane polymer, organo-metalloxane gel, or combination thereof is introduced into the bulk metallic catalyst precursor as part of a solution for forming the bulk metallic catalyst precursor.

11. The bulk metallic catalyst precursor composition of claim 1, wherein the surface area is less than 10 m$^2$/g, or wherein the catalyst precursor is extruded with a binder to form an extruded composition having a surface area of 30 m$^2$/g or less, or a combination thereof.

12. The bulk metallic catalyst precursor composition of claim 1, wherein the Group VIII metal is nickel, cobalt, or a combination thereof, and/or wherein the Group VIB metal is molybdenum, tungsten, or a combination thereof.

13. An amorphous sulfided bulk metallic catalyst comprising a sulfided form of the bulk metallic catalyst precursor composition of claim 1.

14. The amorphous sulfided bulk metallic catalyst of claim 13, wherein gas-phase sulfidation at a temperature of 350° C. or less is used on the bulk metallic catalyst precursor composition to form the sulfided bulk metallic catalyst.

15. An amorphous sulfided bulk metallic catalyst comprising:
- a Group VIII metal;
- a Group VIB metal;
- at least about 10 wt % carbon; and
- about 1 wt % to about 50 wt % of an organo-metalloxane polymer, organo-metalloxane gel, or combination thereof,
- the catalyst being formed by sulfiding a catalyst precursor composition having a surface area of 20 m$^2$/g or less based on BET.

16. The amorphous sulfided bulk metal catalyst of claim 15, wherein the catalyst precursor composition comprises the Group VIII metal, the Group VIB metal, about 10 wt % to about 60 wt % of an organic compound-based component, and the organo-metalloxane polymer, organo-metalloxane gel, or combination thereof.

17. The amorphous sulfided bulk metallic catalyst of claim 15, which contains regions of MeS$_2$ having stack heights averaging about 1.1 to 2.5, wherein Me represents a Group VIB metal, the stack heights optionally averaging about 2.2 or less, or about 2.0 or less.

18. The amorphous sulfided bulk metal catalyst of claim 15, wherein the Group VIII metal is nickel, cobalt, or a combination thereof, and/or wherein the Group VIB metal is molybdenum, tungsten, or a combination thereof.

19. The amorphous sulfided bulk metal catalyst of claim 15, wherein the surface area of the catalyst precursor composition is less than 10 m$^2$/g.

20. The amorphous sulfided bulk metal catalyst of claim 15, further comprising an additional transition metal, the additional transition metal optionally being Co, Ni, Zn, or a combination thereof.

* * * * *